United States Patent
Moody et al.

(10) Patent No.: US 8,739,120 B2
(45) Date of Patent: May 27, 2014

(54) SYSTEM AND METHOD FOR STAGE RENDERING IN A SOFTWARE AUTHORING TOOL

(75) Inventors: Peter Moody, Plano, TX (US); Rebecca Sun, San Francisco, CA (US); Jethro Villegas, San Francisco, CA (US); David Spells, Sachse, TX (US)

(73) Assignee: Adobe Systems Incorporated, San Jose, CA (US)

( * ) Notice: Subject to any disclaimer, the term of this patent is extended or adjusted under 35 U.S.C. 154(b) by 1291 days.

(21) Appl. No.: 11/949,678

(22) Filed: Dec. 3, 2007

(65) Prior Publication Data

US 2013/0198714 A1 Aug. 1, 2013

(51) Int. Cl.
*G06F 9/44* (2006.01)

(52) U.S. Cl.
USPC .......................................................... 717/113

(58) Field of Classification Search
USPC .......................................................... 717/113
See application file for complete search history.

(56) References Cited

U.S. PATENT DOCUMENTS

| | | | |
|---|---|---|---|
| 5,347,629 A | 9/1994 | Barrett et al. | |
| 5,832,231 A * | 11/1998 | Raman et al. | 709/234 |
| 6,570,587 B1 * | 5/2003 | Efrat et al. | 715/723 |
| 6,574,791 B1 | 6/2003 | Gauthier et al. | |
| 7,000,220 B1 | 2/2006 | Booth | |
| 7,779,085 B2 | 8/2010 | Neil et al. | |
| 2002/0078103 A1 * | 6/2002 | Gorman et al. | 707/530 |
| 2003/0131312 A1 | 7/2003 | Dang | |
| 2003/0149761 A1 | 8/2003 | Baldwin et al. | |
| 2004/0083474 A1 | 4/2004 | McKinlay et al. | |
| 2004/0130572 A1 | 7/2004 | Bala | |
| 2006/0136422 A1 | 6/2006 | Matveief et al. | |
| 2006/0242180 A1 | 10/2006 | Graf et al. | |
| 2007/0032287 A1 * | 2/2007 | Osawa | 463/16 |
| 2007/0250783 A1 | 10/2007 | Wu et al. | |
| 2007/0282486 A1 | 12/2007 | Walker et al. | |
| 2008/0028401 A1 | 1/2008 | Geisinger | |
| 2008/0098291 A1 | 4/2008 | Bradley et al. | |
| 2008/0104146 A1 * | 5/2008 | Schwaab et al. | 713/165 |
| 2009/0177961 A1 | 7/2009 | Fortini et al. | |
| 2010/0042919 A1 | 2/2010 | Meyer | |

(Continued)

OTHER PUBLICATIONS

Wang et al; Runtime Software Architecture Based Software Evolution and Adaptation; 2003; COMPSAC.*

(Continued)

*Primary Examiner* — Li B Zhen
*Assistant Examiner* — Bradford Wheaton
(74) *Attorney, Agent, or Firm* — Kilpatrick Townsend & Stockton LLP

(57) ABSTRACT

Systems and methods are provided for rendering a stage in a software authoring tool. A run-time player component is employed for rendering the stage for presenting a preview of output of a software application being authored in the software authoring tool. Thus, a software authoring tool outputs a stage which presents a preview of the output of an application being authored, such as a multimedia application. The output presentation of a multimedia application being authored in the authoring tool is rendered to the stage by a run-time player component. Thus, rather than employing code integrated within the authoring tool for mimicking a run-time player in order to generate a preview of output on the stage, embodiments of the present invention utilize a run-time player component to generate such a preview of output on the stage.

24 Claims, 12 Drawing Sheets

(56) References Cited

U.S. PATENT DOCUMENTS

2010/0070945 A1 3/2010 Tattrie et al.
2013/0198628 A1 8/2013 Ethier et al.
2013/0198720 A1 8/2013 Maurice et al.

OTHER PUBLICATIONS

United States Patent and Trademark Office, Office Action, U.S. Appl. No. 11/507,863, mailed Sep. 19, 2013.
United States Patent and Trademark Office, Office Action, U.S. Appl. No. 11/507,863, mailed Feb. 15, 2013.
United States Patent and Trademark Office, Office Action, U.S. Appl. No. 11/507,863, mailed Oct. 7, 2010.
United States Patent and Trademark Office, Office Action, U.S. Appl. No. 11/507,863, mailed Mar. 16, 2010.
United States Patent and Trademark Office, Office Action, U.S. Appl. No. 11/507,863, mailed Sep. 8, 2009.
United States Patent and Trademark Office, Office Action, U.S. Appl. No. 11/507,863, mailed Jun. 14, 2011.
United States Patent and Trademark Office, Office Action, U.S. Appl. No. 13/250,469, mailed Nov. 15, 2013.
United States Patent and Trademark Office, Office Action, U.S. Appl. No. 13/250,469, mailed Apr. 25, 2013.
Sira, "OACS PCT Quick Reference Guide", May 2002, Version 3: 6 pages.

* cited by examiner

SYSTEM AND METHOD FOR STAGE RENDERING IN A SOFTWARE AUTHORING TOOL

TECHNICAL FIELD

The following description relates generally to software authoring tools, and more specifically to a system and method that employs a run-time player component for rendering a stage in a software authoring tool for presenting a preview of output of a software application being authored in the software authoring tool.

BACKGROUND

Software applications executing on processor-based computing systems are prevalent today, and such applications touch many aspects of life. For instance, users commonly interact with applications for performing such tasks as conducting business (e.g., authoring documents, authoring presentations, performing research, purchasing stocks, etc.), planning trips (e.g., making airline, hotel, and/or rental car reservations), conducting meetings (e.g., via web conference and/or video conference applications), accessing entertainment (e.g., video gaming, etc.), and many more. Many applications are accessible by users over a communication network, such as the Internet. For instance, web pages and other types of interactive applications are commonly accessible via the Internet. To provide greater service to users and/or otherwise improve the user experience, multimedia applications are ever-increasing in popularity. As one example, Rich Internet Applications (RIAs), which are interactive, multimedia applications, that may run on client-side players, for example, ADOBE® FLASH® PLAYER, are very popular.

A variety of authoring tools have been developed to enable developers to author (e.g., create, modify, etc.) software applications, such as multimedia applications. For instance, a variety of programs on the market allow a developer (e.g., a web developer) to create web pages, websites, interactive applications, and the like for use by end users (e.g., visitors to websites). Examples of such authoring tools include ADOBE® DREAMWEAVER™, DIRECTOR™, FIREWORKS®, FLASH®, FLEX®, and FLEX BUILDER®, etc.

DREAMWEAVER is an Integrated Development Environment (IDE) that allows web developers to design Hypertext Markup Language (HTML) web pages in a code editor and also in a graphical-based design time environment. In other words, DREAMWEAVER parses tags (e.g., HTML tags) and renders an interactive simulation of the application in the design time environment. That is, DREAMWEAVER provides a design view that mimics operation of a browser for presenting the author a What You See Is What You Get (WYSIWYG) view for the web page being authored. Thus, a user may edit the application (e.g., web page) being authored by directly editing the tags or by graphically manipulating the design time representation. As the user graphically manipulates the design time representation, DREAMWEAVER changes the tags to reflect the modification. DREAMWEAVER also allows the developer to design with more than just HTML, such as, for example, the developer may use Active Server Page (ASP) and C# from Microsoft Corporation, COLDFUSION™ Markup Language (CFML™), and the like.

FLEX BUILDER and FLASH are authoring tools for creating Rich Internet Applications (RIAs), which are interactive, multimedia applications, that may run on client-side run-time players, for example, ADOBE FLASH PLAYER. MXML™ is the native tag-based language for FLEX BUILDER, and ACTIONSCRIPT™ is a script-based procedural language for FLASH-based RIAs. MXML is an Extensible Markup Language (XML)-based language commonly used to create RIAs and it looks similar in some ways to HTML. A developer may write code in a text editor or FLEX BUILDER and save the MXML. Then, a FLEX SDK may be used, which has command line tools for compiling MXML and ACTIONSCRIPT into a run-time file, such as a SWF ("Small Web Format" or "Shock Wave Flash") file, that can be downloaded and executed on a user's machine. FLEX BUILDER is an IDE that provides a graphical interface into the FLEX SDK. Thus, according to one development technique for developing RIAs using FLEX BUILDER, a developer may write MXML tags and ACTIONSCRIPT code and save it in an MXML file. The FLEX SDK may then be used either directly or indirectly (via FLEX BUILDER) to compile the MXML and ACTIONSCRIPT into ACTIONSCRIPT bytecodes in a run-time file, such as a SWF. SWF is the native file format for the FLASH PLAYER. Thus, as one example, a generated SWF file can be run on the FLASH PLAYER on a user's machine to present the corresponding multimedia output to the user.

Web sites, RIAs, and other multimedia applications generally include one or more output presentation components, such as visual components and or audio components. Visual components are application elements that have a visual appearance on an end-user's screens. Visual components may include text paragraphs, images, animation (e.g., vector animation, bit map animation, movies, videos, etc.), other graphics, and the like. Visual components may also include user-interactive graphics, such as graphics for receiving user input, such as check boxes, data grids, radio buttons, and the like. The visual components of a run-time multimedia application (e.g., a SWF file) are rendered by a run-time player, such as the FLASH PLAYER, to an end-user. Similarly, audio components are audible sound (e.g., music, spoken words, sound-effects, etc.) that are output by a run-time player (e.g., via speakers).

FIG. 1 shows an exemplary system 10 that illustrates a common multimedia authoring scenario of the prior art. As shown, system 10 comprises a processor-computer 11, such as a personal computer (PC), laptop computer, server computer, workstation computer, etc. In this example, an authoring tool 12 is executing on such a computer 11 with which a user may interact to author a multimedia application, such as an RIA. Authoring tool 12 comprises computer-executable software code stored to a computer-readable medium that is readable by a processor of computer 11 and, when executed by such processor, causes computer 11 to perform the various operations described further herein for such authoring tool 12. Examples of such an authoring tool 12 include FLASH, FLEX BUILDER, DIRECTOR, a visual java IDE, a visual content producer for Silverlight (e.g., MICROSOFT's EXPRESSION BLEND) and other applications that produce SWF content, such as Namo FreeMotion and Tivity Software XTIVITY.

Additionally, in this example, a run-time media player 13 is also executing on computer 11, which may receive and play/output a run-time multimedia application (such as one that is authored by authoring application 12). Run-time media player 13 comprises computer-executable software code stored to a computer-readable medium that is readable by a processor of computer 11 and, when executed by such processor, causes computer 11 to perform the various operations described further herein for such run-time media player 13. Examples of such a run-time media player 13 include the FLASH PLAYER, Java, Silverlight (ice., WPFE), and SVG players (e.g., ADOBE SVG Viewer, SVG player embedded in the Opera browser, etc.).

A developer may interact with authoring tool 12 to author a multimedia application. Commonly, authoring tool 12 comprises editing tools 101 with which a user may interact to author (e.g., create, modify, etc.) a multimedia application. That is, authoring tool 12 may present a user interface to a developer, which may enable the developer access to various editing tools 101. Editing tools 101 may comprise any number of tools with which a user may interact to author a multimedia application. Examples of such tools 101 that are commonly included in such authoring tools 12 as FLEX BUILDER include 3D/2D transformation tool, object creation tools such as squares, circles, stars, paths, smart shape objects like pie charts, bubble, etc., tweening and/or blending, tools that create computer-generated intermediate objected between two other objects, constraint based editing tools like flowcharts, inverse kinematics, etc. There are object creation tools which generally translate the user's mouse gestures into objects. For example, a rectangle tool may create a rectangle that is based on the points where the user pressed the mouse button to where the user released the mouse button. Also, generic path tools are often provided that may be used to create a shape based on the mouse movements while the mouse button is depressed. There are often object manipulation tools which may be based on mouse gestures or on entering data into a user interface (UI). For example, a user may size, move or rotate an object on screen by clicking and dragging on certain handles associated with the object on screen or by entering explicit values into text fields in the application. Animation tools are often included that generally let a user set the state of an object (e.g., color, shape, size, etc.) at two different times and generate new objects that change the object from one state to the other state (e.g., tweening, morphing, etc.). Also, there are often included tools that present different author time views to allow the user to see the resulting animation in ways other than one frame at a times. For example, "onion skinning" is a view that allows the user to see multiple frames at a time so they can easily see if the transition from one frame to another is not smooth. Other such editing tools include a selection tool that allows drag and drop movement of drawn objects, and a free transform tool that allows scale, rotate, and skew transformations.

As described above, an authored multimedia application may be compiled into a run-time tile 105, such as a SWF file, that is executable by a run-time player 13. Run-time player 13 generally comprises logic, such as output generation logic 106, for processing the received run-time file 105 and generating an output presentation 107 to an end user. Such output presentation 107 may comprise visual components presented to a display and/or audio components presented to an audio output device (e.g., speakers), for example. For instance, the visual components and/or other output presentation components (e.g., audio, etc.) of the run-time file 105 may be output by the run-time player 13, as output 107, to an end user.

When authoring a multimedia application, a developer may periodically compile the multimedia application into a run-time file 105, and then run the run-time file on a run-time player 13 to evaluate the output 107 to, for instance, determine whether the output 107 is as the developer desires for the multimedia application. If changes to the output 107 are desired by the developer, the developer may edit the multimedia application in authoring tool 12, and re-compile it into another run-time file 105 for re-evaluation using run-time player 13.

Of course, such process of generating a run-time file 105 for the application being authored in the authoring tool 12 in order to evaluate its output using a separate, run-time player 13 becomes unwieldy and inefficient. Thus, many authoring tools 12, such as FLEX BUILDER and FLASH comprise an integrated stage (or "design surface") 102 that presents a preview of the output of an application being authored. That is, authoring tool 12 may present a user interface to a developer, wherein such user interface includes a stage 102. In general, stage 102 represents an output area that mimics the output of a run-time player 13. Thus, the output of a multimedia application being authored in authoring tool 12 may be designed on stage 102. For example, a developer may interact with stage 102 to arrange the output presentation of the multimedia application being authored, such as by arranging/editing media objects 104 (which may comprise output presentation components, such as visual and/or audio components) that are to be presented in the output of the multimedia application. And, the developer can evaluate the output of the multimedia application being authored without being required to compile the application into a run-time file 105 and employing run-time player 13 for evaluating the output. Thus, stage 102 provides a design surface with which a developer may interact to design the desired output of an application being authored.

Typically, stage 102 provides a user-interactive authoring area with which a developer may interact to author (e.g., edit) media object(s) 104 of a multimedia application under development For instance, a developer may use editing tools 101 to perform various editing operations on media object(s) 104, wherein the result of such editing operations may be reflected in the output presentation of such media object(s) 104 on stage 102. Further, editing tools 101 may enable a developer to view the media object(s) 104 presented on stage 102 in a desired authoring format, such as multiple frame view (e.g., an "onion-skin view"), a keyframe only view, a 3D view, a view that shows selection decorators for selected objects or highlighted selected text, etc., or other view that modifies or supplements the mimicked run-time output presentation to some output that aids the author in reviewing and/or editing the output. In this regard, the output presented on the stage 102 may be a hybrid of the mimicked run-time output (e.g., output 107) of the multimedia application being authored and an author-friendly output. For instance, the mimicked run-time output may be altered to present a view of the corresponding mimicked run-time output in some format that is author-friendly, such as onion-skin view, etc., as opposed to a corresponding view of the output that would be presented as output 107 during run-time. Further, in some implementations, a user may interact directly with media object(s) 104 shown on stage 102 to, for example, drag-and-drop selected media object(s) to a desired location on stage 102, rotate selected media object (s) to a desired orientation, remove/delete selected media object(s) from the stage 102) etc.

In this way, stage 102 is similar to a document area commonly presented in a word processor application, such as MICROSOFT® WORD™, in which the portions of a document being authored (e.g., text, etc. that are to be included in the resulting document) are shown in such document area, while editing tools with which a user may interact to format the document (e.g., bold, highlight, underline, highlight, change text color, etc.) are presented outside the document area, as those editing tools are not actually part of the output of the document being authored. Similarly, stage 102 generally presents a preview of the output of a multimedia application being authored. That is, stage 102 presents a preview that attempts to mimic the output 107 that would be output by a run-time player 13 for the multimedia application being authored (if the multimedia application were compiled into a run-time file 105 and executed on run-time player 13). Also, some word processor applications offer the ability to present author-friendly information in the document area, such as symbols that indicate paragraphs, spacing, and/or other formatting information that is present in the document, wherein such author-friendly information (e.g., symbols) is provided in the document area solely for authoring assistance and is not output as part of the document being authored (e.g., the symbols may not be included in a print-out of the authored document). Similarly, as mentioned above, author-friendly information may likewise be presented for an output of a multimedia application on stage 102, such as an author-friendly view (e.g., onion skin view, etc.).

Accordingly, it is generally desirable for stage 102 of authoring tool 12 to output a fairly accurate representation of the output 107 that will be presented during run-time of the multimedia application by run-time player 13. That is, it is desirable for a developer working with authoring tool 12 to receive, via stage 102, an accurate representation of the output 107 that will be generated for the multimedia application by run-time player 13 so that the developer can better evaluate the output and author/design the multimedia application to have a desired output. Traditionally, some logic 103 is implemented in authoring tool 12 for mimicking run-time player 13 in order to generate the output presentation to stage 102. That is, logic 103 is employed for generating stage 102 in a manner that attempts to mimic closely the output (e.g., output 107) that would be presented during run-time for the multimedia application by run-time player 13. A couple of different approaches have been employed within authoring tool 12 of the prior art for mimicking run-time player 13.

According to one approach, actual core code of run-time player 13 is integrated into authoring tool 12. That is, a portion of the underlying software code of run-time player 13 may be integrated within authoring tool 12, and modified to interact with the editing tools 101 and/or other features of the authoring tool 12 in order to render media objects 104 of an application being authored to stage 102. However, such an integration of the run-time player code into the authoring tool 12 has several disadvantages. First, this integration often results in an undesirably large authoring tool 12. That is, the underlying code for implementing the authoring tool 12 may become undesirably large. Additionally, if the code of the run-time player 13 (on which the authoring tool 12 is based in this example) is modified, then the corresponding mimicking code 103 in the authoring tool 12 may need to be modified in order for the authoring tool 12 to continue to accurately present output on stage 102 consistent with the output that would be generated by run-time player 13. For instance, if bugs in the underlying code implementing run-time player 11 are corrected, if new features are added to run-time player 11, and/or if run-time player 13 is overhauled/modified in any way, particularly with regard to how the run-time player 13 generates output 107 (e.g., modifications within the underlying code implementing output generation logic 106 of run-time player 13), it may become necessary to modify the mimicking code 103 of authoring tool 12.

In another approach, mimic logic 103 is independently developed, rather than integrating underlying code of the run-time player 13 into authoring tool 12. In these instances, mimic logic 103 attempts to render an output to stage 102 that is similar to the output that would be rendered by run-time player 13 for a run-time version of the multimedia file being authored, but the mimic logic 103 may achieve its representation of the output to stage 102 in a much different way than run-time player 13 does. That is, the underlying code and operations performed by mimic logic 103 in rendering an output to stage 102 may be much different than that of run-time player 13. Of course, such mimic logic 103 is limited in the accuracy of the output presentation that it generates to stage 102 as compared with an actual, run-time output generated by run-time player 13 for a run-time version of the multimedia application being authored.

In both of the traditional mimicking techniques mentioned above, to maintain the mimic logic 103 up-to-date with a most recent version of a run-time player (e.g., to ensure an accurate reflection on stage 102 of the output presentation 107 that would be generated by the player 13), mimic logic 103 must be periodically updated. Further, the traditional mimicking techniques employed by logic 103 restrict representation of the stage's output to that of a given run-time player 13 that is being mimicked. Different versions of a run-time player and/or different target run-time players to which a multimedia application may be intended are not represented in the authoring tool 12.

In view of the above, a desire exists for an improved system and method for rendering to a stage in an authoring tool a presentation output preview of a multimedia application that is being authored.

SUMMARY

The present invention is directed generally to systems and methods for rendering a stage in a software authoring tool. As described further herein, embodiments of the present invention provide a system and method that employs a run-time player component for rendering a stage in a software authoring tool for presenting a preview of output of a software application being authored in the software authoring tool.

According to one embodiment, a software authoring tool outputs a stage which presents a preview of the output of an application being authored, such as a multimedia application. That is, the authoring tool presents a user interface to a developer, wherein such user interface includes a stage. According to embodiments of the present invention, the output presentation of a multimedia application being authored in the authoring tool is rendered to the stage by a run-time player component. Thus, rather than employing code integrated within the authoring tool for mimicking a run-time player in order to generate a preview of output on the stage, embodiments of the present invention utilize a run-time player component to generate such a preview of output on the stage. Accordingly, a preview of media object(s) forming a presentation output of an application being authored is rendered by a run-time player component to the stage of the authoring tool.

According to certain embodiments, a pre-defined communication interface is provided to enable communication between the authoring tool and the run-time player component. As described further herein, such pre-defined interface is utilized to enable the authoring tool to communicate to the run-time player component sufficient information about a multimedia application being authored to enable such run-time player component to generate an output presentation of the multimedia application, wherein such generated output presentation is rendered to the stage (via the pre-defined interface). Output generation logic of the run-time player component may be utilized to generate an output presentation of the multimedia application being authored, whereby the output presentation is communicated to the authoring tool via the pre-defined interface for rendering on the stage.

The pre-defined interface may comprise any suitable API (application programming interface) that is established for communication between the authoring tool and the run-time player component. As described further herein, in certain embodiments the pre-defined interface uses a run-time file format, such as SWF, for communicating between the authoring tool and the run-time player component. For instance, as described further herein, in certain embodiments, information regarding media objects being authored is packaged by the authoring tool into "mini-SWFs," which are communicated via the pre-defined interface to the run-time player component for generation of the output of such media objects to the authoring tool's stage.

Accordingly, as discussed further herein, certain embodiments of the present invention enable a "live" run-time rendering of a multimedia application that is being authored. In other words, in certain embodiments, the output rendered to the authoring tool's stage is a run-time rendering, by a run-time player component, of the output of the multi-media application being authored in the authoring tool. As such, while the multimedia application is being authored, a live run-time rendering of its output is presented to the authoring tool's stage.

Also, as discussed further herein, in certain embodiments, not only does the run-time player component write to the authoring tool's stage, but the authoring tool may also write to the stage. For instance, the live run-time rendering of media objects may be edited through use of editing tools providing by the authoring tool and/or by a user interacting directly with the media objects being presented on the stage. Thus, the authoring tool and run-time player component both share the stage in that they can each write to the stage. Accordingly, the stage provides an effective design surface for an author. In certain embodiments, the run-time player component renders to the stage a live preview of the output of a multimedia application being authored, while the authoring tool may render additional information to the stage to assist a user in editing the multimedia objects being rendered. Also, as described further herein, the authoring tool may enable a user to interact with the media objects that are rendered on the stage (by the run-time player component) for editing such media objects. Thus, in certain embodiments, editing of a live rendering of a presentation output is supported. Further, the authoring tool and/or run-time player component may render a desired author-friendly view and/or editing tools, such as those mentioned above with traditional authoring tools. Thus, for instance, the live run-time rendering of the output presentation may be modified and/or supplemented in some ways by either the authoring tool or the run-time player component to present such an author-friendly view on the stage.

Additionally, as described further herein, use of a run-time player component for rendering to a authoring tool's stage of presentation output of a multimedia application being authored in the authoring tool enables an accurate representation of the presentation output without the requirement of maintaining/updating internal mimic code within the authoring tool, such as mimic logic 103 of FIG. 1. As modifications are made to the run-time player component over time (e.g., fixing of bugs, adding of new features, etc.), the rendering to the authoring tool's stage of a preview provides an accurate reflection of the output that would be rendered by the run-time player, as it is the run-time player component that is rendering such preview to the stage.

Also, as discussed further herein, in certain embodiments the concepts described herein may be employed to enable rendering of a preview of output presentation to the authoring tool's stage by any of a plurality of different run-time players with which the authoring tool may be configured to interact (e.g., via a pre-defined interface). For instance, any of various different run-time players (or different versions of run-time players) which support interaction via the pre-defined interface may be utilized for presenting an author an accurate preview on the authoring tool's stage of the presentation output that would be generated by such run-time player for the multimedia application being authored.

As discussed further herein, in certain embodiments, an object model is created and maintained by the authoring tool for media objects that are being authored. Additionally, a shadow object model for the media objects may be created and maintained in the run-time player component. That is, the authoring tool communicates via a predefined interface information about the media objects to the run-time player component so that the run-time player component can maintain a shadow object model. As changes are made within the authoring tool to the media objects, the authoring tool updates the object model and communicates information to the run-time player component so that it can update its shadow object model. Also, in certain embodiments, drawing context information is communicated via a pre-defined interface to the run-time player component to provide information about the context in which the media objects are to be rendered on the stage. For instance, in certain embodiments, such drawing context information may identify a desired authoring view, such as an onion skin view, etc. that the run-time player component is to render to the stage.

In operation of one embodiment of the present invention, an authoring tool receives input for authoring a software application (e.g., a multimedia application), wherein the input defines one or more presentation output objects of the software application. Such input defining the one or more presentation output objects may comprise creation of a new presentation output object and/or editing of a presentation output object. The authoring tool communicates (e.g., via a predefined interface) information about the defined one or more presentation output objects to a run-time player component. In certain embodiments, the authoring tool communicates object model information to enable the run-time player component to maintain a shadow object model. In certain embodiments, the authoring tool may communicate drawing context information to run-time player component. For instance, such drawing context information may be communicated to request the run-time player component to update the drawing being rendered to the stage responsive to authoring actions that do not define (e.g., create or modify) a presentation output object but which cause a change in the presentation on stage, such as a request for a different authoring view (e.g., an onion-skin view, etc.). In certain embodiments, the authoring tool communicates information about the defined one or more presentation output objects to the run-time player component in a run-time file format such as SWF. The run-time player component renders to the authoring tool's stage a display of the one or more presentation output objects. As such, the run-time player component provides a live, run-time rendering of the presentation output objects of an application being authored in the authoring tool.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
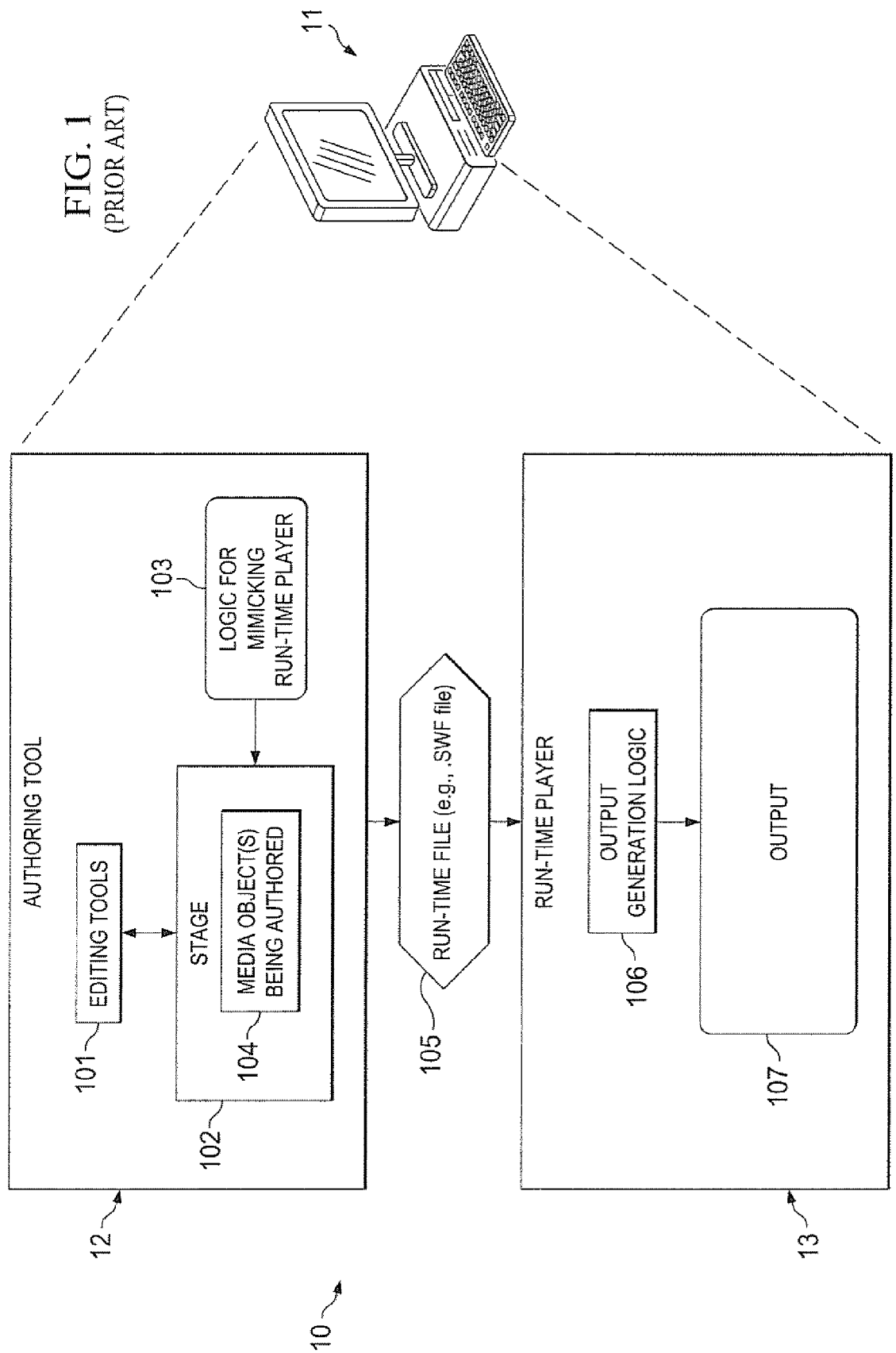
FIG. 1 shows an exemplary system that illustrates a common multimedia authoring scenario of the prior art.
Figure 2:
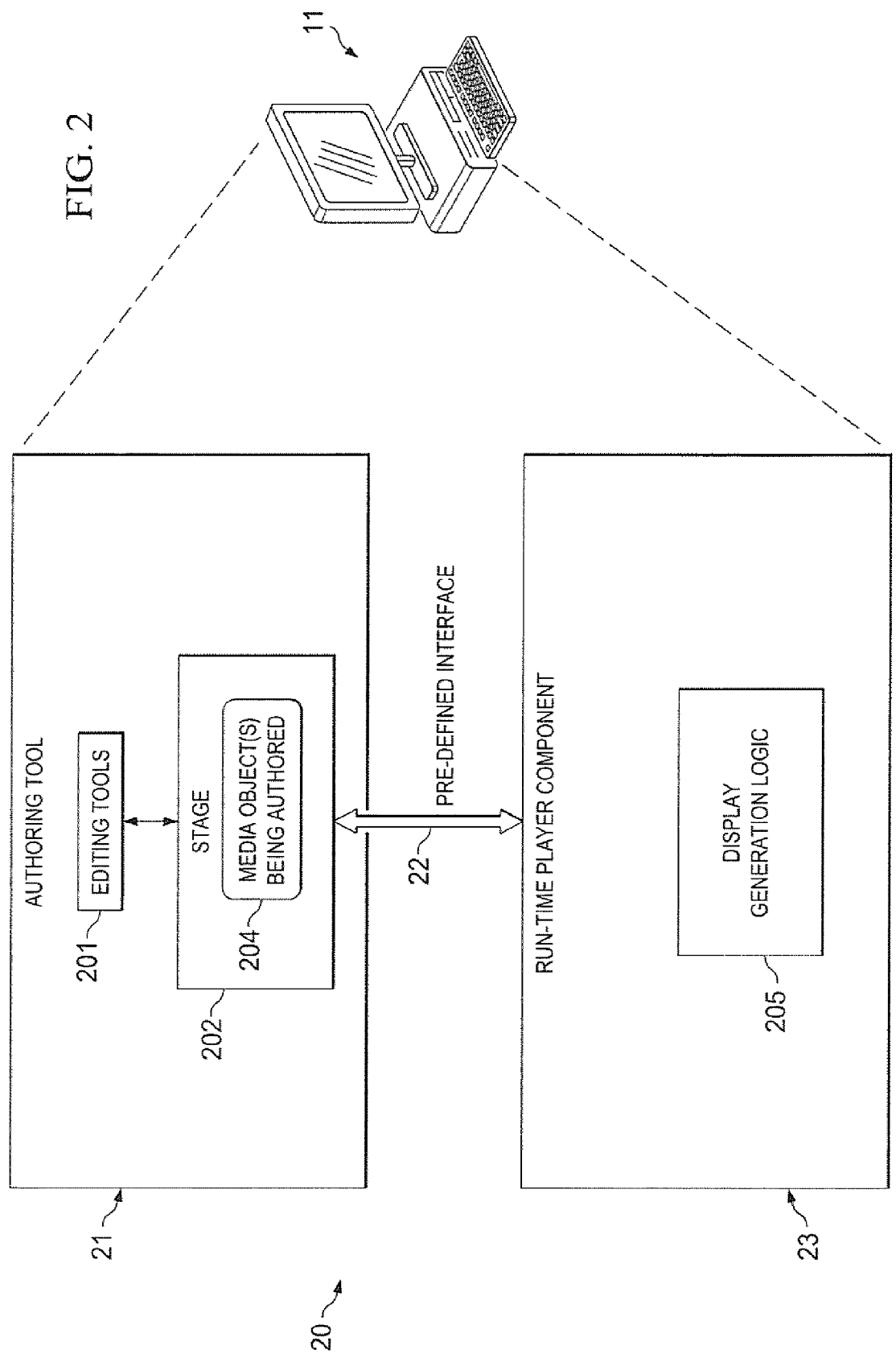
FIG. 2 shows an exemplary system according to one embodiment of tile present invention.

Turning to FIG. 2, an exemplary system 20 according to one embodiment of the present invention is shown. As shown, system 20 comprises a processor-based computer 11, such as a personal computer (PC), laptop computer, server computer workstation computer, etc. In this example, an authoring tool 21 is executing on such a computer 11 with which a user may interact to author a multimedia application, such as an RIA. As with the exemplary authoring tool 12 of FIG. 1, authoring tool 21 comprises computer-executable software code stored to a computer-readable medium that is readable by a processor of computer 11 and, when executed by such processor, causes computer 11 to perform the various operations described further herein for such authoring tool 21.

Additionally, in this example, a run-time media player component 23 is also executing on computer 11. Run-time media player component 23 comprises computer-executable software code stored to a computer-readable medium that is readable by a processor of computer 11 and, when executed by such processor, causes computer 11 to perform the various operations described further herein for such run-time media player component 23.

In certain embodiments, run-time player component 23 may be used for running/outputting compiled, run-time multimedia applications. That is, run-time player component 23 may, in some embodiments, be a consumer version of a run-time player that can be used in the manner described in FIG. 1 for run-time player 13 to generate an output 107, in addition to its ability to interact with authoring tool 21 for generating stage 21 as described further herein. Thus, in certain embodiments, a consumer version of the run-time player component 23 is implemented to be able to handle both interaction and drawing in an authoring tool. This may be accomplished by allowing the run-time player component 23 to be launched in two different modes. The two different modes might be differentiated by parameters passed on launch. One mode would be "headless" or "ui-less" in which a user would only be able to interact with it indirectly through the authoring environment 21, while the other mode would bring up the UI and a user could interact with it using its own UI.

Thus, the run-time player component 23 may be an actual consumer version of a run-time player, such as the run-time FLASH PLAYER, that includes added support for interacting with the authoring tool 21. Such run-time player component 23 may be used to output a movie (e.g., a test movie) generated by a run-time multimedia application, and it may also be used for generating a stage of an authoring tool 21 as discussed further herein. When a movie is being executed by the run-time player (e.g., as a test movie), the generated SWF is loaded into the player, but the authoring tool 21 does not interact with the run-time player further (that is, the player runs the SWF as normal). When the run-time player component 23 is being used for rendering a stage in authoring tool 21, a special SWF is loaded into the player in certain embodiments (as discussed further herein) and the authoring tool 21 interacts with the run-time player component 23 via the API's that the player and the SWF provide.

In this example, authoring tool 21 and run-time player component 23 are executing on computer 11. However, while authoring tool 21 and run-time player component 23 are shown as executing on computer 11 for ease of illustration in FIG. 2, it should be recognized that one or both of such applications may be residing and/or executing either locally on computer 11 or on a remote computer to which computer 11 is communicatively coupled via a communication network, such as a local area network (LAN), the Internet or other wide area network (WAN), etc.

As with the example of FIG. 1, authoring tool 21 may enable development of software code for a multimedia application, such as a RIA (e.g., as is commonly coded using such authoring tools as FLASH, FLEX BUILDER, etc., as mentioned above). In this example, as with the above example of FIG. 1, authoring tool 21 is operable to present one or more user interfaces with which a user (e.g., developer) may interact to author a document, such as a multimedia application. For instance, as with the exemplary authoring tool 12 of FIG. 1, authoring tool 21 comprises editing tools 201 with which a user may interact to author (e.g., create, modify, etc.) a multimedia application. That is, authoring tool 21 may present a user interface to a developer, which may enable the developer access to various editing tools 201. Editing tools 201 may comprise any number of tools with which a user may interact to author a multimedia application, such as the exemplary editing tools 101 mentioned above with FIG. 1.

In this example, authoring tool 21 again presents a stage 202, which presents a preview of the output of the application being authored. That is, authoring tool 21 presents a user interface to a developer, wherein such user interface includes a stage 202. According to embodiments of the present invention, the output presentation of a multimedia application being authored in authoring tool 21 is rendered to stage 202 by run-time player component 23. Thus, rather than employing code within authoring tool 21 for mimicking a run-time player in order to generate a preview of output on stage 202, embodiments of the present invention utilize a run-time player component 23 to generate such a preview of output on stage 202. Accordingly, a preview of media object(s) 204 forming a presentation output of an application being authored is rendered by run-time player component 23 to stage 202 of authoring tool 21.

According to certain embodiments, a pre-defined communication interface 22 is provided to enable communication between authoring tool 21 and run-time player component 23. As described further herein, such pre-defined interface 22 is utilized to enable authoring tool 21 to communicate to run-time player component 23 sufficient information about a multimedia application being authored to enable such run-time player component 23 to generate an output presentation of the multimedia application, wherein such generated output presentation is rendered to stage 202 (via the pre-defined interface 22). Output generation logic 205 of run-time player component 23 may be utilized to generate an output presentation of the multimedia application being authored, whereby the output presentation is communicated to authoring tool 21 via pre-defined interface 22 for rendering on stage 202.

Pre-defined interface 22 may comprise any suitable API (application programming interface) that is established for communication between authoring tool 21 and run-time player component 23. As described further herein, in certain embodiments the pre-defined interface 22 uses a run-time file format, such as SWF, for communicating between authoring tool 21 and run-time player component 23. For instance, as described further herein, in certain embodiments, information regarding media objects 204 being authored is packaged by authoring tool 21 into "mini-SWFs," which are communicated via interface 22 to run-time player component 23 for generation of the output of such media objects 204 to stage 202. Exemplary embodiments for communicating information from authoring tool 21 to run-time player component 23 for rendering of an output preview to stage 202 by the run-time player component 23 are described further herein.

Accordingly, as discussed further herein, certain embodiments of the present invention enable a "live" run-time rendering of a multimedia application that is being authored. In other words, in certain embodiments, the output rendered to stage 202 within authoring tool 21 is a run-time rendering by run-time player component 23 of the output of the multimedia application being authored in authoring tool 21. As such, while the multimedia application is being authored, a live run-time rendering of its output is presented to state 202.

Also, as discussed further herein, in certain embodiments, not only does run-time player component 23 write to stage 202, but authoring tool 21 may also write to stage 202. For instance, the live run-time rendering of media objects 204 may be edited through use of editing tools 201 and/or interacting directly with the media objects 204 being presented on stage 202. Thus, the authoring tool 21 and run-time player component 23 both share stage 202 in that they can each write to the stage 202. In certain embodiments, run-time player component 23 renders to stage 202 a live preview of the output of a multimedia application being authored, while authoring tool 21 may render additional information to stage 202 to assist a user in editing the multimedia objects 204 being rendered. Further, as described further herein, authoring tool 21 may enable a user to interact with the media objects 204 that are rendered on stage 202 (by run-time player component 23) for editing such media objects 204. Thus, in certain embodiments, editing of a live rendering of a presentation output is supported.

Additionally, as described further herein, use of run-time player component 23 for rendering to stage 202 of presentation output of a multimedia application being authored in authoring tool 21 enables an accurate representation of the presentation output without the requirement of maintaining/updating internal mimic code within authoring tool 21, such as mimic logic 103 of FIG. 1. As modifications are made to the run-time player component 23 over time (e.g., fixing of bugs, adding of new features, etc.), the rendering to stage 202 of a preview provides an accurate reflection of the output that would be rendered by the run-time player, as it is the run-time player component 23 that is rendering such preview to stage 202.

Also, as discussed further herein, in certain embodiments the concepts described herein may be employed to enable rendering of a preview of output presentation to stage 202 by any of a plurality of different run-time players with which the authoring tool 21 may be configured to interact (e.g., via pre-defined interface 22). For instance, any of various different run-time players (or different versions of run-time players) which support interaction via pre-defined interface 22 may be utilized for presenting an author an accurate preview on stage 202 of the presentation output that would be generated by such run-time player for the multimedia application being authored.

As discussed further herein, in certain embodiments, an object model is created and maintained by authoring tool 21 for media objects 204 that are being authored. Additionally, a shadow object model for the media objects 204 may be created and maintained in the run-time player component 23. That is, authoring tool 21 communicates via predefined interface 22 information about the media objects 204 to run-time player component 23 so that the run-time player component 23 can maintain a shadow object model. As changes are made within authoring tool 21 to the media objects 204, authoring tool 21 updates the object model and communicates information to run-time player component 23 so that it can update its shadow object model. Also, in certain embodiments, drawing context information is communicated via pre-defined interface 22 to run-time player component 23 to provide information about the context in which the media objects 204 are to be rendered on stage 202. For instance, in certain embodiments, such drawing context information may identify a desired authoring view, such as an onion skin view, etc. that the run-time player component 23 is to render to stage 202.

As with the traditional stage 102 of FIG. 1, a developer may interact with stage 202 to arrange the output presentation of the multimedia application being authored, such as by arranging/editing media objects 204 (which may comprise output presentation components, such as visual and/or audio components) that are to be presented in the output of the multimedia application. And, the developer can evaluate the output of the multimedia application being authored without being required to compile the application into a run-time file 105 and employing run-time player 13 for evaluating the output (as in the traditional technique of FIG. 1).

Figure 3:
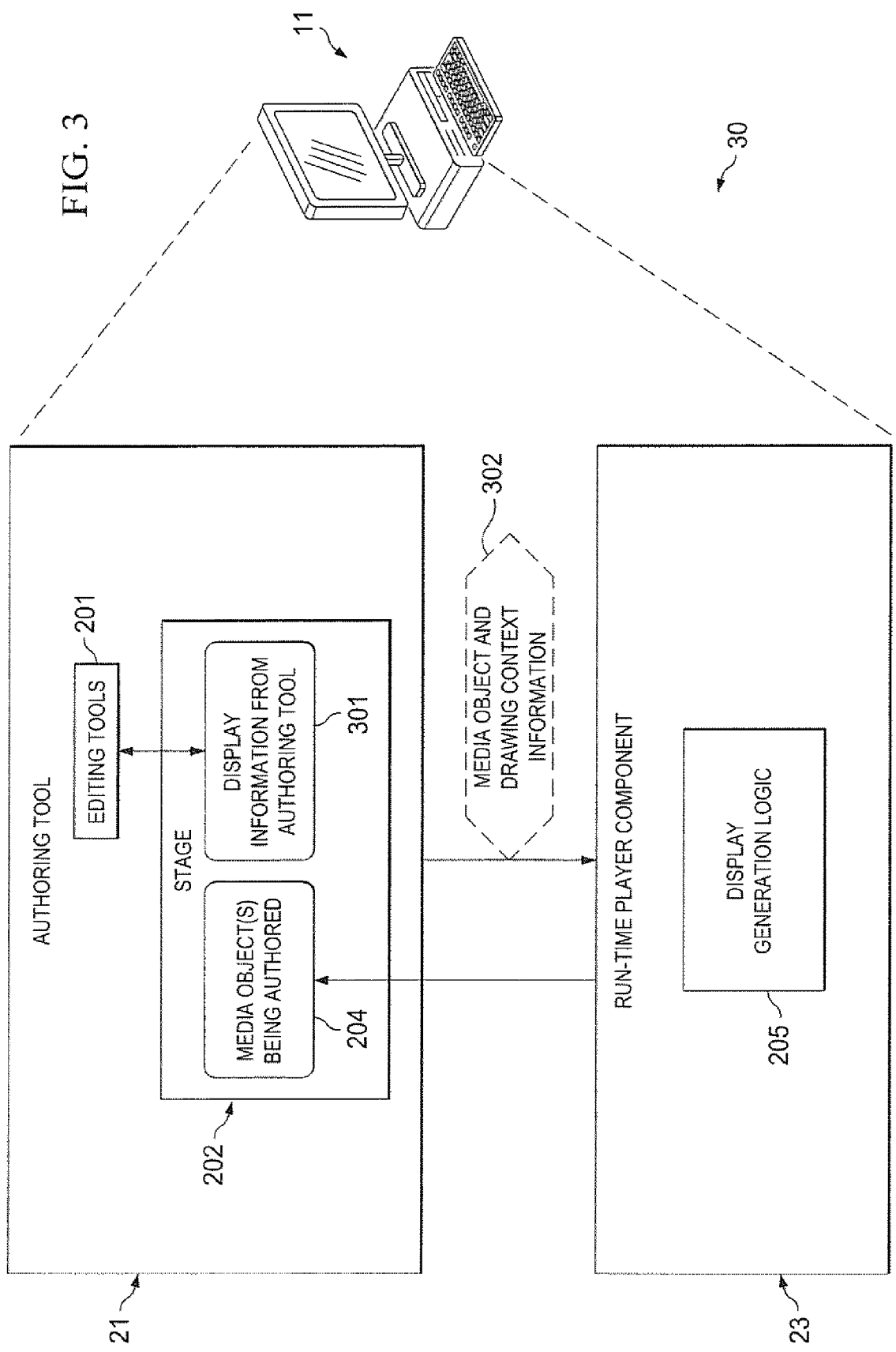
FIG. 3 shows an exemplary system according to one embodiment of the present invention.

Turning to FIG. 3, an exemplary system 30 according to one embodiment of the present invention is shown. As with the example of FIG. 2 described above, system 30 again comprises processor-based computer 11 on which authoring tool 21 and run-time player component 23 are executing. In this exemplary embodiment, authoring tool 21 communicates information 302, which may include media object and drawing context information, to run-time player component 23 for media objects 204 being authored in authoring tool 21. For instance, an object model may be created and maintained by authoring tool 21 for media objects 204 that are being authored. Additionally, authoring tool 21 communicates via predefined interface 22 information 302 about the media objects 204 to run-time player component 23 so that the run-time player component 23 can maintain a shadow object model. As changes are made within authoring tool 21 to the media objects 204, authoring tool 21 updates the object model and communicates information 302 to run-time player component 23 so that it can update its shadow object model.

Additionally or alternatively, information 302 may in some instances comprise drawing context information that provides information about the context in which the media objects 204 are to be rendered on stage 202. For instance, in certain embodiments, such drawing context information may identify a desired authoring view, such as an onion skin view, etc. that the run-time player component 23 is to render to stage 202. As discussed further herein, information 302 may be communicated in a run-time file format, such as SWF. For instance, in certain embodiments information 302 is packaged by authoring tool 21 into "mini-SWFs," which are communicated to run-time player component 23 for generation of the output of such media objects 204 to stage 202.

As further shown in FIG. 3, output generation logic 205 of run-time player component 23 may be utilized to generate an output presentation to stage 202 of the multimedia application being authored. That is, run-time player component 23 renders media objects 204 of the multimedia application being authored to stage 202 of authoring tool 21. Accordingly, as discussed further herein this exemplary embodiment enables a "live" run-time rendering of a multimedia application that is being authored. In other words, the output of media objects 204 rendered to stage 202 within authoring tool 21 is a run-time rendering by run-time player component 23 of the output of the multi-media application being authored ill authoring tool 21.

Also, in this exemplary embodiment, in addition to run-time player component 23 rendering media objects 204 on stage 202, authoring tool 21 may also write display information 301 to stage 202. For instance, the live run-time rendering of media objects 204 may be edited through use of editing tools 201 and/or interacting directly with the media objects 204 being presented on stage 202. Exemplary objects that authoring tool 21 may draw to stage 202 include a document area on top of the larger markup area, Grids and guides Tool, specific feedback such as a transform tool selection box and handles, as well as a text block that is being actively edited. Thus, the authoring tool 21 and run-time player component 23 both share stage 202 in that they can each write to the stage 202.

Figure 4:
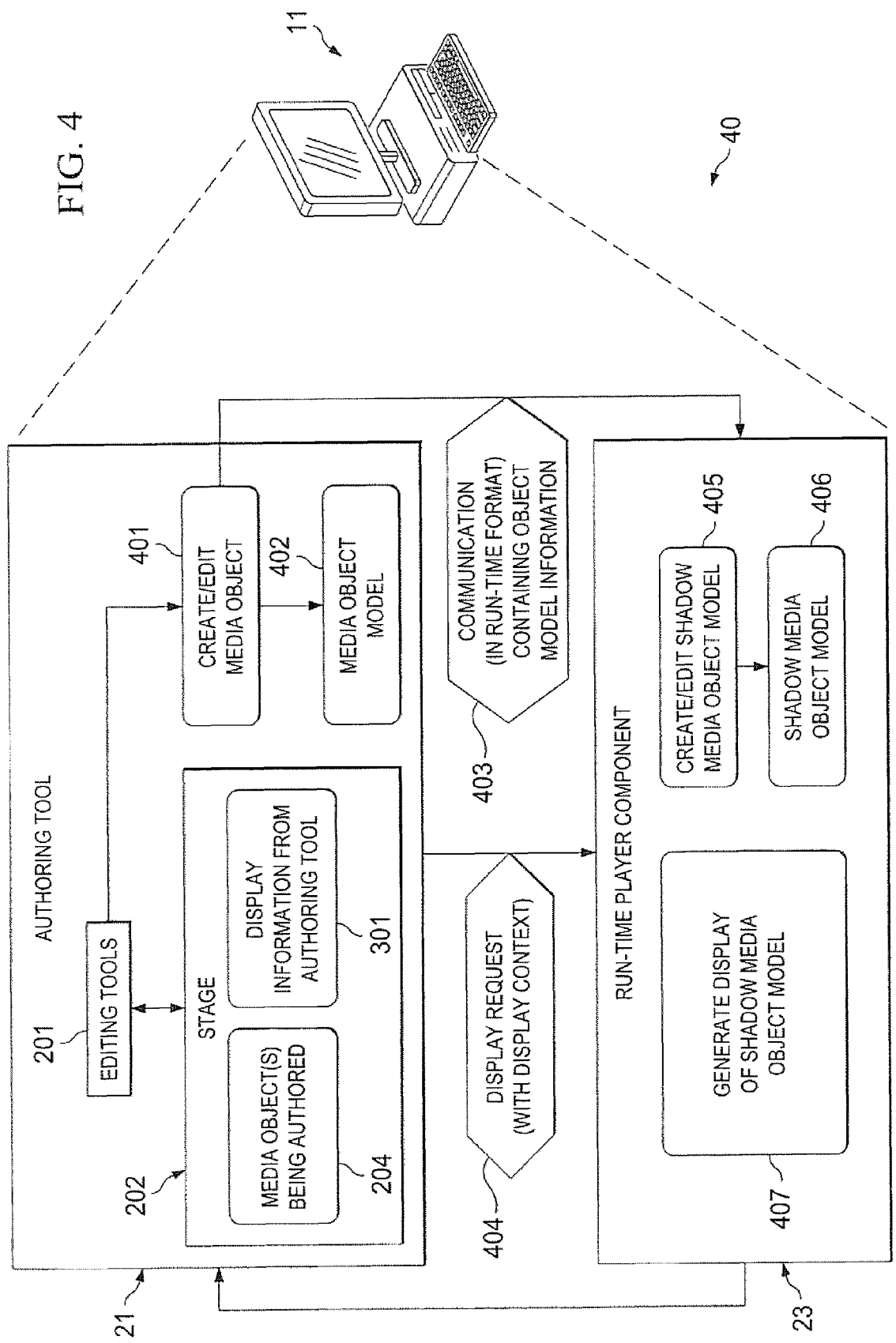
FIG. 4 shows a more detailed block diagram of an exemplary system according to one embodiment of the present invention.

Turning to FIG. 4, a more detailed exemplary system 40 according to one embodiment of the present invention is shown. As with the example of FIG. 2 described above, system 40 again comprises processor-based computer 11 on which authoring tool 21 and run-time player component 23 are executing. In this exemplary embodiment, authoring tool 21 creates and maintains an object model 402 for media objects 204 that are being authored. That is, an author may interact with editing tools 201 (and/or directly with a graphical representation of an object being rendered on stage 202) to create and/or edit a media object (shown as operational block 401), and authoring tool 21 creates and maintains (e.g., modifies) a corresponding media object model 402. Such media object model 402 comprises data defining object(s) 204, wherein such data is stored to a computer-readable medium. Additionally, responsive to the creation and/or editing operations 401, object model information 403 is communicated to run-time player component 23. Such information 403 may be communicated in a run-time file format, such as SWF. For instance, in certain embodiments, information 403 is packaged by authoring tool 21 into "mini-SWFs," which are communicated to run-time player component 23 for generation of the output of the corresponding media objects 204 to stage 202.

Run-time player component 23 receives object model information 403 and creates and/or edits (in operational block 405) a shadow media object model 406. Thus, run-time player component 23 creates and maintains a shadow object model 406 for the media objects of the multimedia application being authored in authoring tool 21. As changes/edits are made within authoring tool 21 to the media objects 204, authoring tool 21 updates its object model 402 and communicates information 403 to run-time player component 23 so that run-time player component 23 can (via operational block 405) update its shadow object model 406 correspondingly.

Additionally, in some instances a display request 404 that comprises display context information is communicated from authoring tool 21 to run-time player component 23. For instance, when an action is taken in authoring tool 21 that requires a new/updated rendering of media objects 204 to stage 202 (e.g., which might not result in a change to the object model 402, and thus might not result in a communication of information 403 to run-lime player component 23), authoring tool 21 communicates a display request 404 that contains display (or drawing) context information to run-time player component 23. As an example, in FLASH, a user can click on an icon in the timeline to turn on an "onion-skin view", which would then send the request to the run-time player component 23 to generate the "onion-skin" frames. In one embodiment, a new display request is generated whenever the view onto the object model (but not the object model itself changes. Examples include when a user of the authoring tool 21 changes from one frame in the time line to another, when the user scrubs the time line, when the user turns on/off the onion-skin mode, when the user changes the onion-skin behavior (like showing between frame or edit multiple frames), etc. In all of these exemplary cases, the view of the object model changes but the object model itself does not.

As further shown in FIG. 4, run-time player component 23 generates (e.g., via output generation logic 205 of FIGS. 2-3) a display to stage 202 of its shadow media object 406 as media objects 204, shown as operational block 407 of FIG. 4. For instance, responsive to a received display request 404, run-time player component 23 may, in operational block 407, render a display of the media objects 204 to stage 202. Thus, a "live" run-time rendering is provided to stage 202 for the multimedia application that is being authored. In some instances of this exemplary embodiment, the run-time player component 23 may recognize creation/modification of an object in the shadow media object model 406 (via receipt of object model information 403 and performance of operations 405), and may generate an updated display 407 to stage 202 without receipt of a separate display request 404, whereas in other instances (such as when the authoring view changes without a change being made to the object model) a separate display request 404 may be used to generate the updated display 407, For instance, in certain embodiments, the display request 404 may be used to request an update to the stage when an authoring action is taken in the authoring tool 21 that does not modify the object model 402, and thus because the action does not result in updated model information 403 being communicated to run-time player component 23, the separate display request 404 is utilized to update the run-time player's rendering to the stage.

In most cases, modifications to the objects originate from the authoring tool 21 in the following order: an event (like a mouse click) is recognized by the authoring tool 21, the authoring tool can then update the local object model and then communicate the change to the shadow object model or pass the event directly to the shadow object model. If the shadow object model creates other shadow objects or display objects, then a display update is automatically generated by the run-time player component 23 when the display object is created.

In certain embodiments, a new display request is generated by authoring tool 21 when the view changes but not the object model When the object model changes the display can be updated directly without the need for a display request. It should be noted that modifying the object model will not update the display until there has been a display request. The display request specifies what to draw and how to draw it, and so in this exemplary embodiment the stage is not automatically updated until that information is obtained. Also, updating the object model does not necessarily have to update the stage. The user of the authoring tool 21 could be viewing frame one, and through some command in the authoring tool 21 the user may add something to frame two. Even though the object model in the run-time player component 23 may be updated in this instant, the display will not be because the change in the object model effects a portion of the output that is not being presented on the stage (e.g., it effects a different frame).

Figure 5:
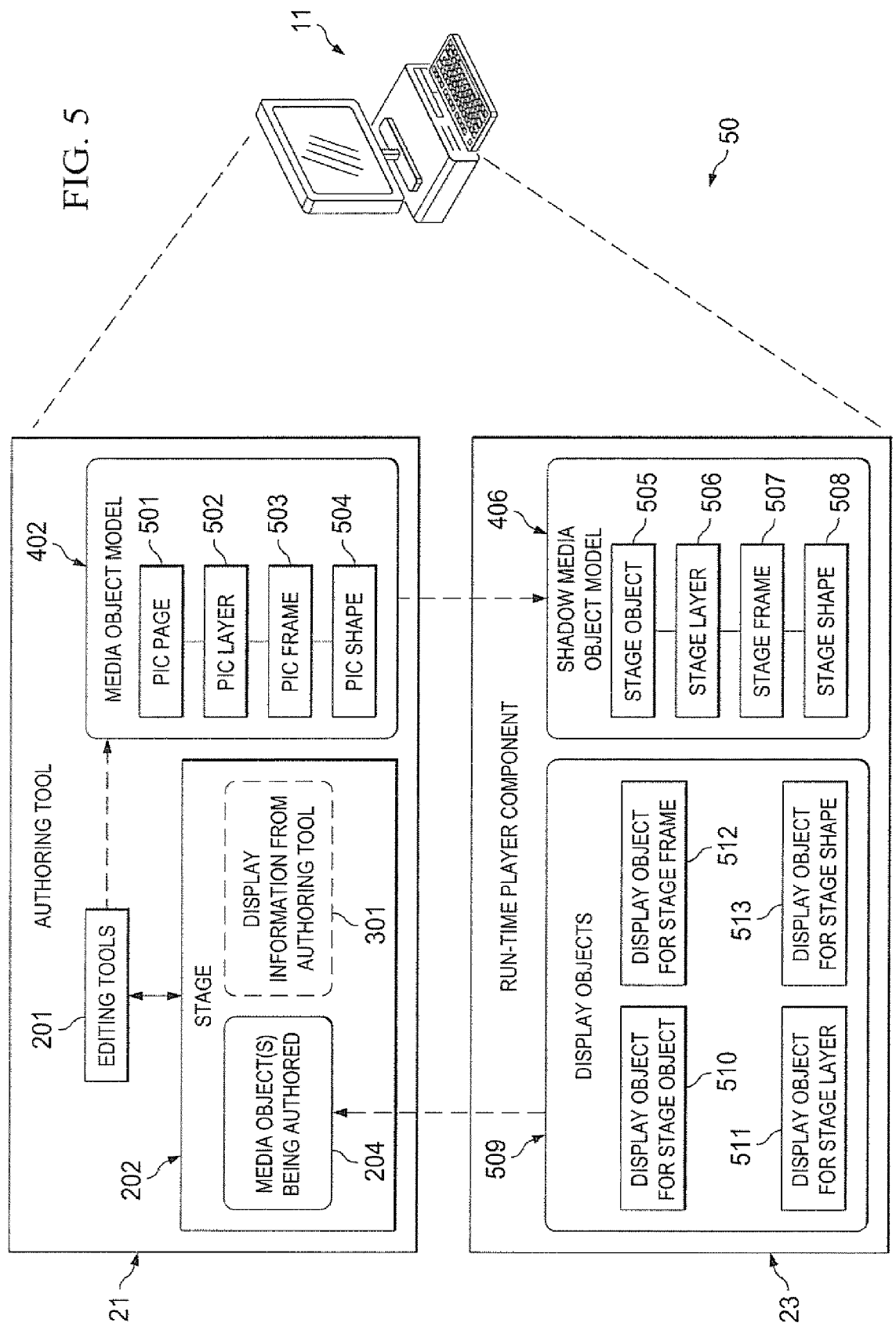
FIG. 5 shows an exemplary system according to one embodiment of the present invention, which illustrates an exemplary media object model and shadow media object model that may be employed.

FIG. 5 shows an exemplary system 50 according to one embodiment of the present invention. As with the example of FIG. 2 described above, system 50 again comprises processor-based computer 11 on which authoring tool 21 and run-time player component 23 are executing. In this exemplary embodiment, authoring tool 21 creates and maintains an object model 402 for media objects 204 that are being authored. That is, an author may interact with editing tools 201 to create and/or edit a media object (shown as operational block 401), and authoring tool 21 creates and maintains (e.g., modifies) a corresponding media object model 402. In the illustrated example, media object model 402 comprises a hierarchical model of an object, wherein such hierarchical model includes pic page 501, pic layer 502, pic frame 503, and pic shape 504. Pic page object 501 represents a timeline. Pic layer object 502 represents a layer of a timeline. Pic frame object 503 contains frame data. Pic Shape object 504 (or pic symbol object, pic bitmap object, pic sound object, etc.) contains shape, symbol, bitmap, sound, and/or other output presentation data.

In general, an object is either a single object like a shape (PicShape, PicSymbol, PicBitmap, etc) or a collection of objects (PicPage PicLayer, PicFrame). Creating a hierarchy of objects is a convenient way to organize and manipulate a drawing that is used in other drawing applications. For example, an ILLUSTRATOR document has layers, groups and objects like shapes, bitmaps and text. A PHOTOSHOP document is a collection of layers that each represent a bitmap. The difference between those applications and FLASH is that they are used to create static drawings, while FLASH is used to create animations. So, FLASH has the concept of a PicFrame that represents the state of a PicLayer at a given point in time. The PicPage is the root node of the object hierarchy as such is analogous to the ILLUSTRATOR or PHOTOSHOP document. Various other authoring tools, such as FLEX BUILDER, may likewise use a similar type of object hierarchy.

Media object model 402 may be referred to as an object store, and provides a representation of the media content hierarchy in an application (e.g., Flash application) being authored. In certain embodiments, the object store is traversed for various operations in authoring tool 217 such as SWF export and FLA serialization.

As discussed above with FIG. 4, run-time player component 23 creates and maintains a shadow media object model 406. In the illustrated example, shadow media object model 406 comprises a hierarchical model of an object, wherein such hierarchical model includes stage object 505, stage layer 506, stage frame 507, and stage shape 508. In this exemplary embodiment, the StageObjects represent the display aspect of their corresponding PicObject in the authoring tool 21. So, in FIG. 4, StageObject (the PicPage) 505 represents the root node of the StageObject hierarchy. StageLayer 506 represents the PicLayer. The StageFrame 507 represents the PicFrame and the StageShape 508 represents the PicShape. The amount of data they contain may be determined as an implementation detail due to performance considerations, for example, based on a determination of what is deemed too costly to keep calling back into the authoring tool to get. For example, a StageInstance, which represents a PicSymbol in the authoring tool 21, may be implemented to keep a list of the filters that need to be applied to the display object. This data is readily available in the authoring tool but may be deemed to take too much time to query every time it is needed and thus may be stored in the StageInstance. In general, the StageObject's type and its position in the overall hierarchy is all that is needed to generate the display of the object model. The data they have to maintain is the list of child StageObjects and the display objects that is has generated.

Thus, the hierarchy of the media object model 402 (potentially with only some of the data) is reproduced as a shadow media object model 406 in run-time player component 23. For instance, in one embodiment such shadow media object model 406 is reproduced in ActionScript in a StagePlayer.swf (described further with reference to FIG. 6 below). In this exemplary embodiment, the ActionScript hierarchy (shadow media object model 406) is responsible for: a) generating display objects 509 to visually represent the objects on the stage 202; and b) maintaining communication between the pic objects and their corresponding display objects. In addition to generating the display objects, the StageObjects are responsible for positioning them in the display so they accurately represent the document. They position them both in the X/Y plane but in the stacking order as they relate to the other object in the display.

Thus, in this exemplary embodiment, run-time player component 23 generates display object(s) 509 that are to be rendered to stage 202 (i.e., as presentation output of media objects 204). In this example, display object 509 comprises display object 510 for stage object 505 of shadow object model 406, display object 511 for stage layer 506 of shadow object model 406, display object 512 for stage frame 507 of shadow object model 406, and display object 513 for stage shape 508 of shadow object model 406. According to one embodiment, the display objects 510-513 are SPRITES Generated by run-time player component 23. As is well-known in the art, in multimedia productions, a SPRITE generally refers to a graphic image, usually animated, that a user can interact with and edit (e.g., move around). It should be noted that in this exemplary embodiment, the display objects are Action- Script Sprite objects. Also, the SPRITE is a collection class, so it contains the other display objects.

Specifically, in this exemplary embodiment, the display object SPRITE contains the mini-SWF of the PicObject, which could be a MovieClip, Text, Bitmap or another other display object type. The display object SPRITE also contains any display objects that where generated for the StageObjects that are children of the StageObject the display object represents. Finally, the display object SPRITE contains a special shape used to show selection decorators.

In general, in this exemplary embodiment, a display object is created when a StageObject is asked to draw itself It can draw itself as a result of the entire StageObject hierarchy getting a display request from the authoring tool or because the StageObject was added to the hierarchy and the hierarchy was already drawn. When a StageObject is asked to draw itself, it is given the parent display object it needs to "draw" into and the location in that display object it needs to be at. The StageObject then creates a display object and adds it to the parent's display object. Depending on what type of StageObject it is, it might request a mini-SWF of the StageObject's PicObject to be generated in the authoring tool and loaded into the display object, or the StageObject may create an instance of another ActionScript display object class. If the StageObject has any children, it then asks each of its children to draw into the newly created display object.

In this exemplary embodiment, there is not necessarily a 1:1 mapping between the subclasses in the media object model 402 and the shadow media object model 406. And, it should be noted that embodiments of the present invention are not limited to the exemplary set of objects described for this embodiment.

Figure 6:
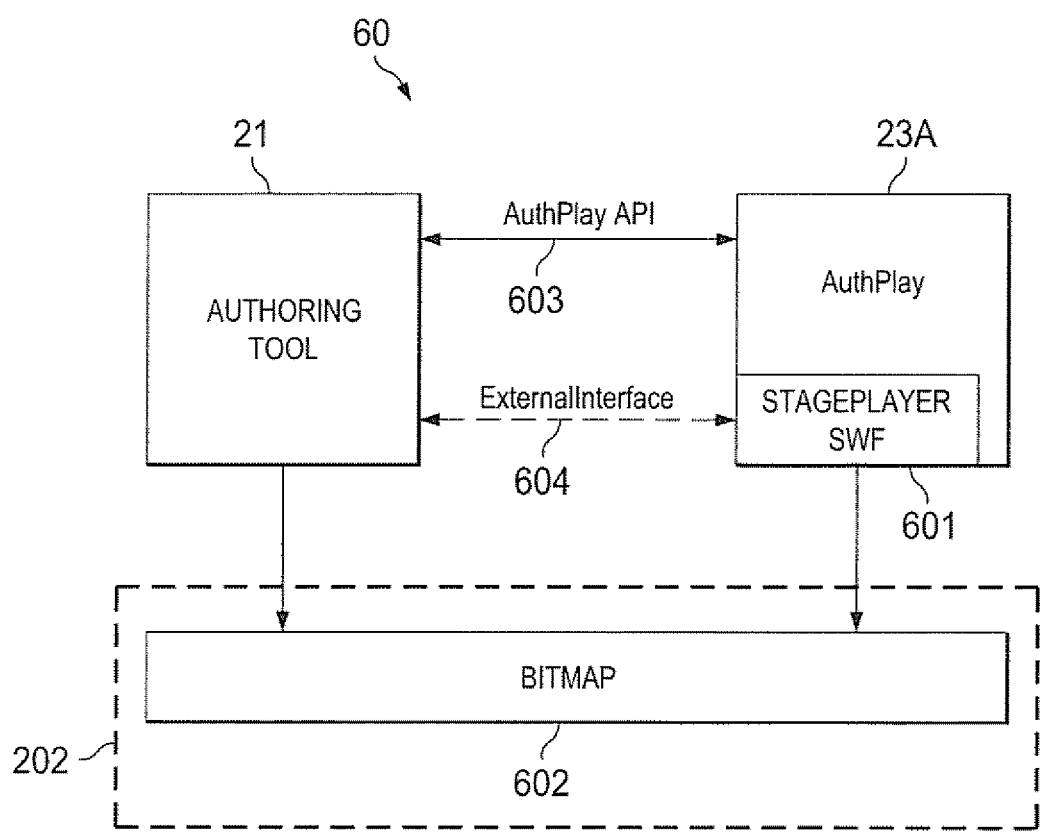
FIG. 6 shows an exemplary block diagram of a system according to one embodiment of the present invention.

Turning to FIG. 6, an exemplary block diagram of a system 60 according to one embodiment of the present invention is shown. As with the example of FIG. 2 described above, system 60 again comprises authoring tool 21 that is executing on a processor-based computer, such as computer 11 of FIG. 2. Additionally, an example of a run-time player component 23, referred to in this exemplary embodiment as "AuthPlay" 23A, is also executing on such processor-based computer. Authplay 23A runs a StagePlayer.swf 601, which communicates with authoring tool 21 using an external interface 604. Such external interface 604 may be an AS3 External Interface class. ExternalInterface allows the code in a running SWF to interact with the application that is hosting the player. It allows the SWF to expose methods that the hosting application can call like native function and it allows the SWF to call into the host. In a web browser, a web page may have some JavaScript code that calls into the SWF to perform some action or the SWF may call into JavaScript code on the web page to do something.

In general, Authplay 23A comprises a shared library or DLL that is basically a headless version of a run-time player, such as the FLASH PLAYER. That is, Authplay 23A may be a version of the FLASH PLAYER made specifically for embedding in other applications. So, Authplay 23A may considered as a consumer version of the FLASH PLAYER that is modified to talk to a hosting application, but it is not specifically modified to render the authoring tool's stage.

StagePlayer SWF 601 is, in this exemplary embodiment, the run-time player component written in ActionScript that contains object level description (both data and logic) of the shadow object model. Some of the object level descriptions will generate/create display objects onto the "display list" which is owned by AuthPlay. The display objects are rendered to the stage by AuthPlay.

In this example, an example of the predefined interface 22 of FIG. 2 is shown, which comprises AuthPlay API 603 and ExternalInterface 604. In this example, the AuthPlay API is the set of interfaces that allow the hosting application to host and drive the embedded player. ExternalInterface is the API that allows the host to communicate with the SWF running in the embedded player. The ExternalInterface calls are piped through functions in the AuthPlay API. So, while the host does communicate with the running SWF, it still does it through the AuthPlay API. The types of calls that are made with the AuthPlay API are things like scaling the running movie, making the player "play", setting the bitmap in the player that player needs to draw into. The player may make some calls to have the authoring tool draw what it needs to draw, or for the authoring tool to load a URL. The calls that are made through ExternalInterface (via the AuthPlay API) are things like add an object to the shadow hierarchy, update an objects data, draw the hierarchy. The SWF may make calls through ExternalInterface to the host to find out more information about an object so it may be drawn correctly.

As shown in FIG. 6, authoring tool 21 and Authplay 23A render to the same bitmap 602 on stage 202. Thus, for instance, Authplay 23A may render a presentation output of media objects of an application being authored, while authoring tool 21 can write such authoring assistance information as handles, etc., to bitmap 602. According to this exemplary embodiment, the stage 202 may be rendered by drawing the stage underlay, such as background, document page, grid lines, etc.; drawing StagePlayer.swf 601; and drawing stage overlay (e.g., selection handles and guide). In this exemplary embodiment, the underlay and overlay are drawn by authoring tool 21 and StagePlayer.swf 601 is drawn by AuthPlay 23A.

StagePlayer.swf 601 has its own version of the authoring tool's object store, each symbol or shape instance draws itself. Since the authoring tool 21 owns the bitmap 602, it can draw the tools and their handles on the bitmap 602 without interfering with the rest of the stage drawing.

An ExternalShape AS3 class is included in Authplay 23A. ExternalShape contains an ID that maps the instance of the class with an instance of the authoring tool's internal stage object. When the player encounters an ExternalShape instance while rendering, it uses a new Authplay API (FPA_DrawExternalShape) to send a bitmap to the authoring tool for rendering.

Every level of the object store (layer, frame, shape) implements Draw function, which takes a Draw context. Draw context contains such information as display object being drawn into, location (index) where the current object goes, range of frames being drawn and current index in that range, and onion-skinning mode.

Draw functions can access information about the instance, like xform, color xform, from the authoring tool 21 via External Interface callbacks.

Some tool handles and selection are drawn by the authoring tool 21 in the main bitmap that it owns. Selection of fills and strokes is drawn in a top layer of the Sprite that represents the whole shape. Drawing API calls are made from authoring tool 21 to StagePlayer SWF 601 via External Interface 604 to draw the selection hashing as bitmap fills. In-place editing is managed solely in StagePlayer SWF 601, which keeps track of edit stack and display objects to be drawn. In certain embodiments, the selection hashing of fills and strokes are done by loading in new mini-SWFs for the object being selected. General selection like selecting the entire shape is done in a layer on top of the SPRITE.

Figure 7:
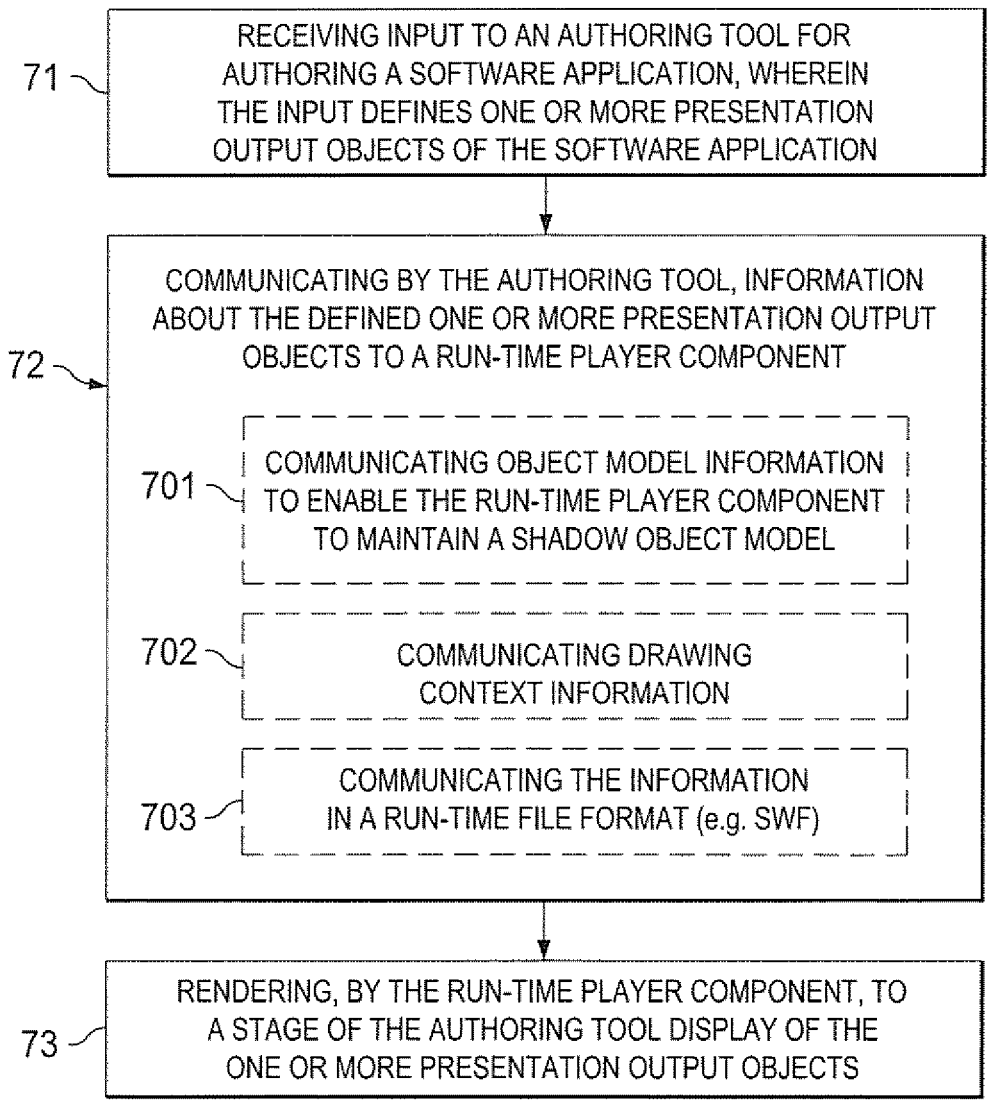
FIG. 7 shows an exemplary operational flow diagram of one embodiment of the present invention.

Turning to FIG. 7, an exemplary operational flow diagram of one embodiment of the present invention is shown. In operational block 71, an authoring tool 21 receives input for authoring a software application (e.g., a multimedia application), wherein the input defines one or more presentation output objects of the software application. Such input defining the one or more presentation output objects may comprise creation of a new presentation output object and/or editing of a presentation output object. For instance, editing tools 201 may be employed to define (e.g., create and/or modify) a presentation output object.

In operational block 72, the authoring tool communicates (e.g., via predefined interface 22 of FIG. 2) information about the defined one or more presentation output objects to a run-time player component 23. Exemplary optional features that may be included in certain embodiments are shown in dashed lines as operational sub-blocks 701-703. For instance, in certain embodiments, the authoring tool 21 communicates object model information 403 (of FIG. 4) to enable the run-time player component 23 to maintain a shadow object model 406, as shown in block 701. In certain embodiments, as shown in block 702, the authoring tool 21 may communicate drawing context information 404 to run-time player component 23 to, for instance, request such run-time player component 23 to update the drawing being rendered to stage 202 responsive to authoring actions that do not define (e.g., create or modify) a presentation output object but which cause a change in the presentation on stage 202, such as a request for a different authoring view (e.g., an onion-skin view, etc.). In certain embodiments, authoring tool 21 communicates information about the defined one or more presentation output objects to run-time player component 23 in a run-time file format such as SWF, as shown in block 703.

In operational block 73, the run-time player component 23 renders to the authoring tool's stage 202 a display of the one or more presentation output objects. As such, the run-time player component 23 provides a live, run-time rendering of the presentation output objects of an application being) authored.

Figure 8A:
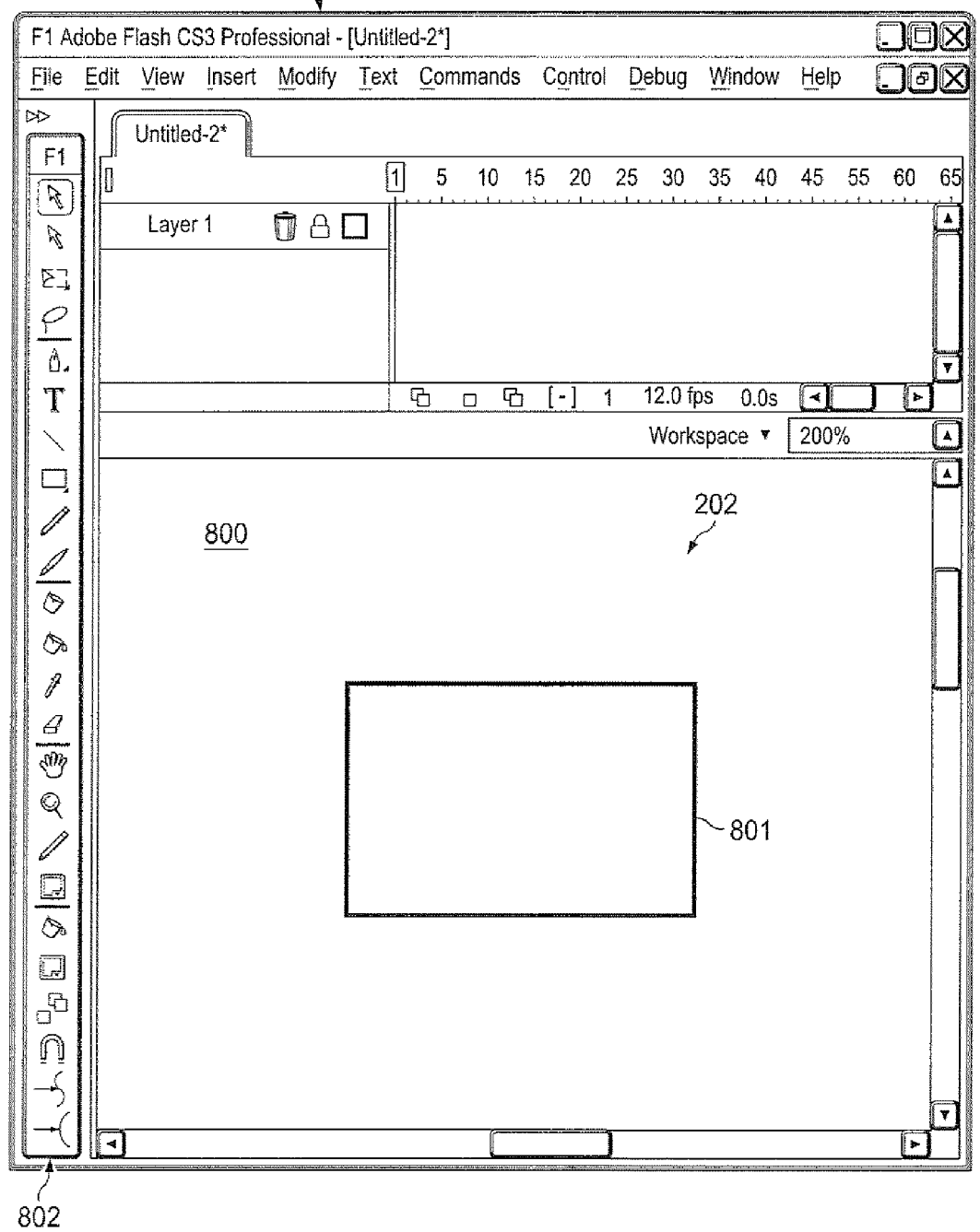
FIGS. 8A-8C show an exemplary user interface of an authoring tool with which an illustrative example of one embodiment of the present invention is described.
Figure 8B:
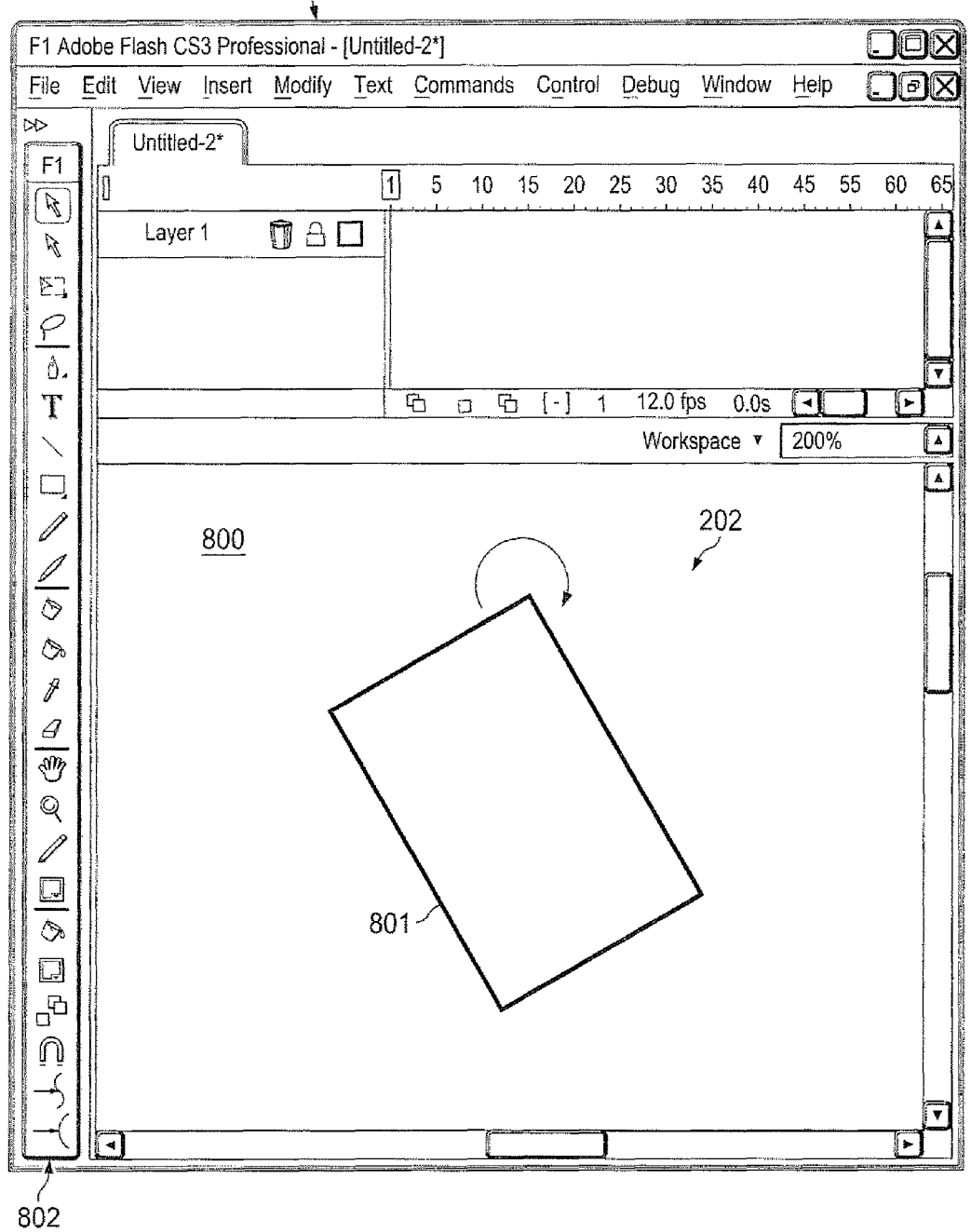
Figure 8C:
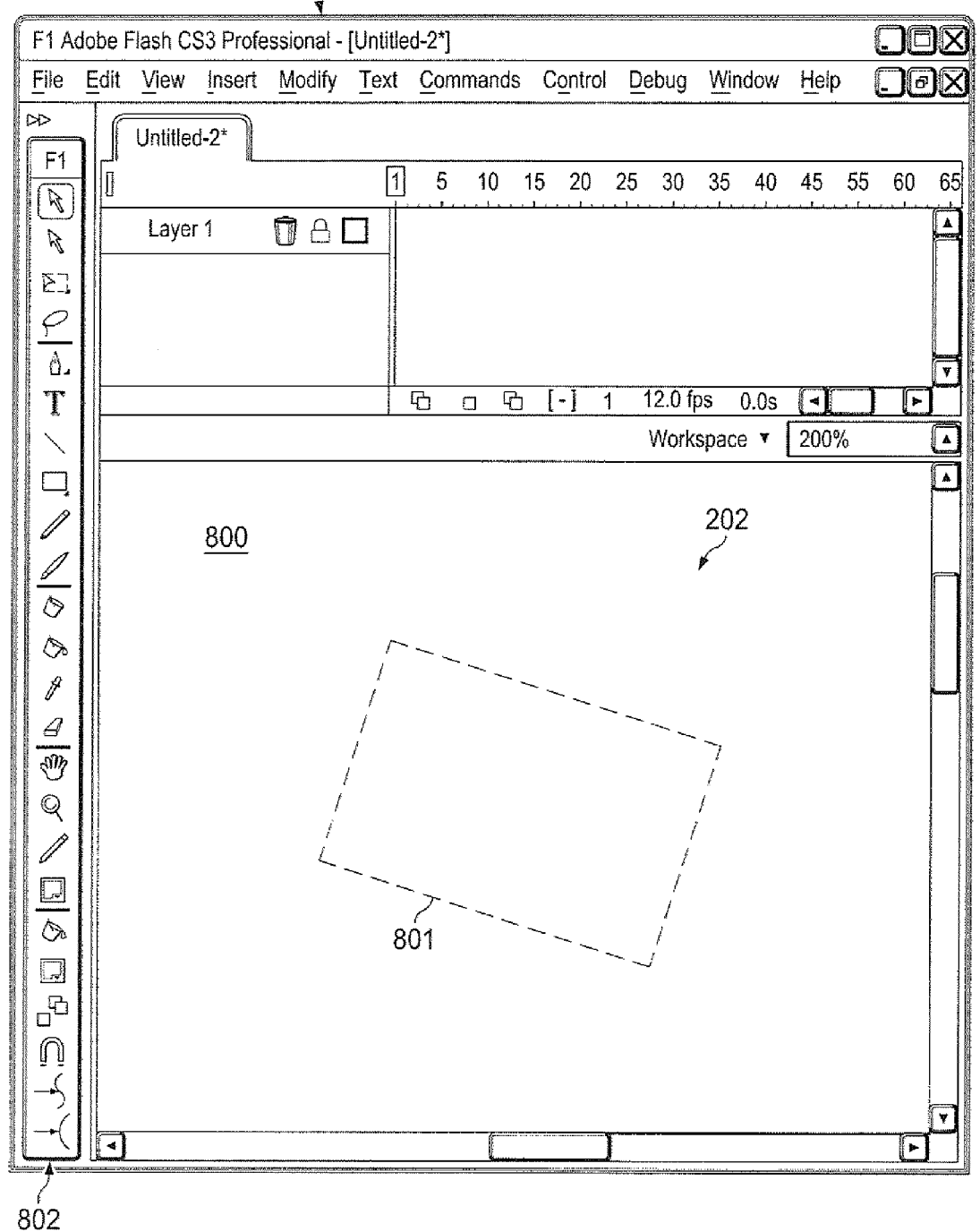

An illustrative example of one embodiment of the present invention is now described with reference to FIGS. 8A-8C. As described hereafter, this illustrative example describes a relatively simple application authoring scenario in which an author interacts with a user interface of authoring tool 21 to create a presentation output object, which in this example is a rectangle 801. Rectangle 801 is rendered by a run-time player component 23 in stage 202 of the authoring tools' interface 800, as shown in FIG. 8A. Then, the author interacts with authoring tool 21 to rotate the rectangle 801 to a desired orientation, and the resulting rotated rectangle 801 is rendered to stage 202 by run-time player component 23 as shown in FIG. 8B. The author then interacts with authoring tool 21 to request a different authoring view, such as an onion-skin view, and the output to stage 202 is updated to reflect the newly requested authoring view, as shown in FIG. 8C. The actions performed by and between authoring tool 21 and run-time player component 23 according to this exemplary embodiment for rendering the output to stage 202 for the illustrative examples of FIGS. 8A-8C are described further hereafter.

FIG. 8A shows an exemplary user-interactive interface 800 of an authoring tool 21 with which an author (e.g., developer) may interact to author a software application. The interface 800 of authoring tool 21 comprises a stage 202, as well as various editing/authoring tools such as those shown in the portions of the interface 800 that reside outside of stage 202.

According to this exemplary scenario, when an author interacts with authoring tool 21 to create a new page or a new document, a hierarchical object model is created by the authoring tool. For instance, the authoring tool generates an object model 402 that comprises a pic page 501, which in turn has a pic layer 502 and pic frame 503, as shown in FIG. 5. Authoring tool 21 communicates (e.g., through ExternalInterface 604 of FIG. 6) object model information to the run-time player component 23 so that the run-time player component can generate a corresponding shadow object model 406 that comprises stage object 505, stage layer 506, and stage frame 507, as shown in FIG. 5.

The authoring tool 21 may then request a display of stage 202 (e.g., via communicating a request 404 with display context) from run-time player component 23. Run-time player component 23 generates a SPRITE for the page (e.g., display object for stage object 510 of FIG. 5), a SPRITE for the layer (e.g., display object for stage layer 511 of FIG. 5), and a SPRITE for the frame (e.g., display object for stage fame 512 of FIG. 5). Since at this point the levels of the hierarchical object model are essentially empty containers that do not yet define any objects, nothing is displayed to stage 202 (i.e., a blank stage 202 is initially presented).

Now, in the exemplary scenario of FIG. 8A, the author interacts with user interface 800 of authoring tool 21 to add rectangle 801. For instance, the author may employ well-known techniques for inserting rectangle 801 into the application being authored, such as by selecting a rectangle from toolbox 802 and dragging and dropping such selected rectangle onto stage 202. So, the authoring tool 21 updates its object model 402 to add pic shape 504 defining the properties of rectangle 801. Additionally, authoring tool 21 communicates (e.g., through the ExternalInterface 604 of FIG. 6) object model information 403 (of FIG. 4) to run-time player 23 so that the run-time player 23 can generate corresponding stage shape 508 in its shadow object model 406. According to one embodiment, authoring tool 21 communicates via ExternalInterface 604 to request StagePlayer SWF 601 to generate the stage shape object 508 for rectangle 801. Run-time player component 23 generates in its shadow object model 406 a stage shape object 508 that contains the properties defined for rectangle 801. Run-time player component 23 generates a SPRITE for the stage shape object 508 (e.g., display object for stage shape 513 of FIG. 5), which is rendered to stage 202. Thus, run-time player component 23 renders the display of the rectangle 801 to stage 202 of authoring tool 21, resulting in rectangle 801 being displayed on stage 202 as shown in FIG. 8A. According to this exemplary embodiment, as part of adding shape object 508 to the run-time player component's stage object model (hierarchy) 406, the parent stage object 505 of the shadow object model 406 recognizes that it contains a newly added child object in its hierarchy. The parent stage object 505 knows the children that it has drawn before, and it creates its own draw context specifically for the newly added child object (e.g., shape object 508 in this example). The child object 508 then draws itself (e.g., by generating display object 513 (e.g., a SPRITE).

Continuing with this exemplar authoring scenario, suppose the author next interacts with authoring tool 21 to modify certain properties of the rectangle 801, such as modifying its placement/location on stage 202, its orientation, its size, its color, etc. In response, authoring tool 21 updates the properties for rectangle 801 in pic shape object 504, and also communicates information to run-time player component to update the properties of corresponding stage shape object 508 so that run-time player component 23 generates an updated display of rectangle 801 for rendering to stage 202. According to the illustrative example of FIGS. 8A-8C, the author interacts with user interface 800 of authoring tool 21 to rotate rectangle 801 to a desired orientation. For instance, the author may employ well-known techniques for rotating rectangle 801 to a desired orientation, such as by interacting directly with the displayed rectangle 801 on stage 202 to click and drag the rectangle 801 around an axis to the desired orientation. In response to the rotating operation, the authoring tool 21 updates the properties of pic shape object 504 in its object model 402. For instance, information concerning the new transformation matrix for the rectangle object 801 for orienting it as desired may be stored to pic shape object 504. Various hooks may be implemented within authoring tool 21 to cause authoring tool 21 to notify run-time player component 23 of certain authoring operations and/or chances to properties of objects. The rotate operation may trigger such a notification. Accordingly, authoring tool 21 communicates (e.g., through the ExternalInterface 604 of FIG. 6) the updated object model information 403 (of FIG. 4) to run-time player 23 to inform run-time player 23 of the updated orientation information for rectangle 801. For instance, information concerning the new transformation matrix for the rectangle object 801 for orienting it as desired is communicated to run-time player component 23, whereby run-time player component updates corresponding stage shape object 508 in its shadow object model 406. Run-time player component 23 generates an updated SPRITE for the stage shape object 508 (e.g., display object for stage shape 513 of FIG. 5), which is rendered to stage 202. Thus, run-time player component 23 renders to stage 202 the display of the rectangle 801 being rotated to the desired orientation, resulting in rotated rectangle 801 being displayed on stage 202 as shown in FIG. 8B. Other property changes made by the author to rectangle 801 through user interface 800 of authoring tool 21 may likewise be updated in the object model 402 and communicated to the run-time player component 23 for updating shadow object model 406 and for causing run-time player component 23 to render the corresponding updated object to stage 202.

As another example, suppose the author performs some authoring action that does not alter a property of the rectangle 801, but which results in a change in the display presented to stage 202, such as changing the view to an onion-skin view, outline mode, or other view change that does not change the object model but which changes the output to the stage 202. FIG. 8C shows an example of the author output responsive to the user changing the view to outline mode, which (like onion skin mode) changes the display but not the properties of the rectangle 801. In this case, after rotating, the user has decided to view the outlines of the objects in the drawing instead of their actual appearance. The user switches the view from full preview mode to outline mode (in this case by selecting an item from the main menu). When the view mode is changed a new display request is generated and sent to the StagePlayer swf. The new request specifies that objects are drawn as outlines. The request is passed to the StageObject for the PicPage which passes the request to the StageLayer which passes the request to the StageFrame which passes the request to the StageShape. In this exemplary implementation, each StageObject has already generated display object but in the general case a new display object is generated for each StageObject the same as in item 86. In this case though, since the stage has a rectangle the view will have the outline of the rectangle, as shown in FIG. 8C.

It should be recognized that the approach described herein may be employed to enable any of a plurality of different run-time player components to be used for rendering to an authoring tool's stage. For instance, different versions of a given run-time player may be employed to render to an authoring tool's stage. As another example, any of a plurality of different run-time players to which the application being authored may be targeted can be selectively employed to render to the authoring tool's stage. According to certain embodiments, the authoring tool 21 may enable an author to select any of a plurality of different run-time player components to render presentation output of the application being authored to the stage 202. In this way, the author can readily evaluate the presentation output of the application that is generated by one or more of different run-time players for which the application may be targeted.

Figure 9:
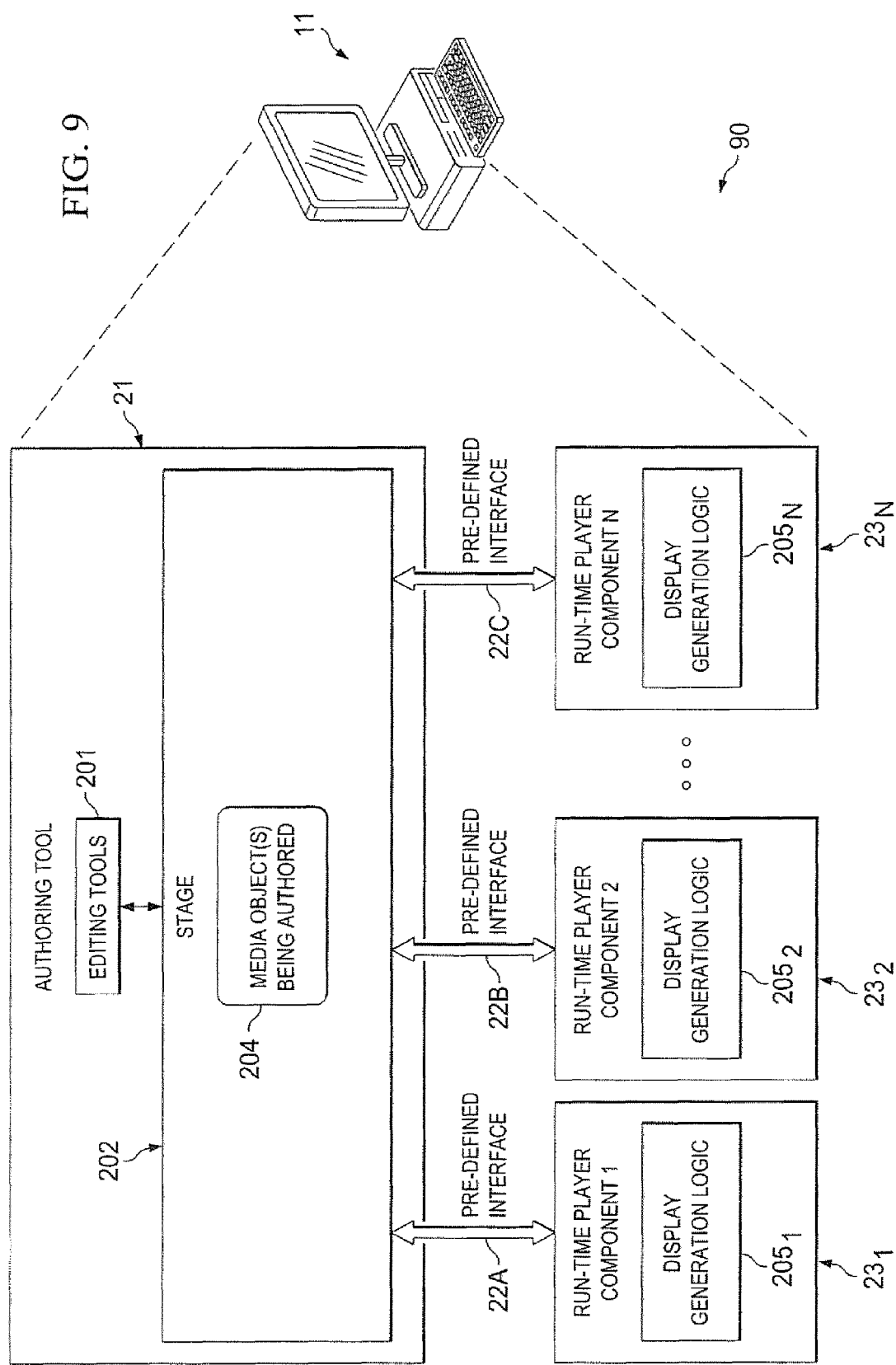
FIG. 9 shows an exemplary system block diagram illustrating that according to one embodiment of the present invention any of a plurality of different run-time player components may be employed for rendering to an authoring tool's stage.

FIG. 9 shows an exemplary system 90, which includes a plurality of different run-time player components $23_1$, $23_2, \ldots, 23_N$. Run-time player components $23_1, 23_2, \ldots, 23_N$ each comprise corresponding display generation logic $205_1$, $205_2, \ldots, 205_N$. A corresponding predefined interface 22A, 22B, . . . , 22C is defined for each of the run-time player components to enable interaction between authoring tool 21 and the run-time player component in a manner similar to that described above. Each of predefined interfaces 22A-22C may be the same interface or a different interface may be defined for one or more of the run-time player components, which authoring tool 21 may support. According to this exemplar embodiment, authoring tool 21 enables an author to select any of the plurality of different run-time player components $23_1$, $23_2, \ldots, 23_N$ to employ for rendering presentation output of the application being authored to the stage 202. In this way, the author can readily evaluate the presentation output of the application that is generated by one or more of different run-time players for which the application may be targeted.

Thus, various different types of run-time players may be encompassed, such as different mobile telephones and/or other run-time players for which the application may be targeted, some examples of which are mentioned hereafter. A different runtime component for different versions of the runtime component with different functionality (like future version of the FLASH PLAYER, version 10, 11, 12, 13, etc. . . . ) may be utilized in certain embodiments. A version of the runtime component with slightly different functionality corresponding to a particular device may be utilized in certain embodiments. A version of the runtime component that contains an emulator for a specific device may be utilized in certain embodiments. These devices might be mobile phonies, set top boxes, mp3 players, video game machines, smart televisions, a car with a built-in computing device and display screen, and/or any other device can have a corresponding runtime component.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, computer readable media can include any medium that can store information.

Figure 10:
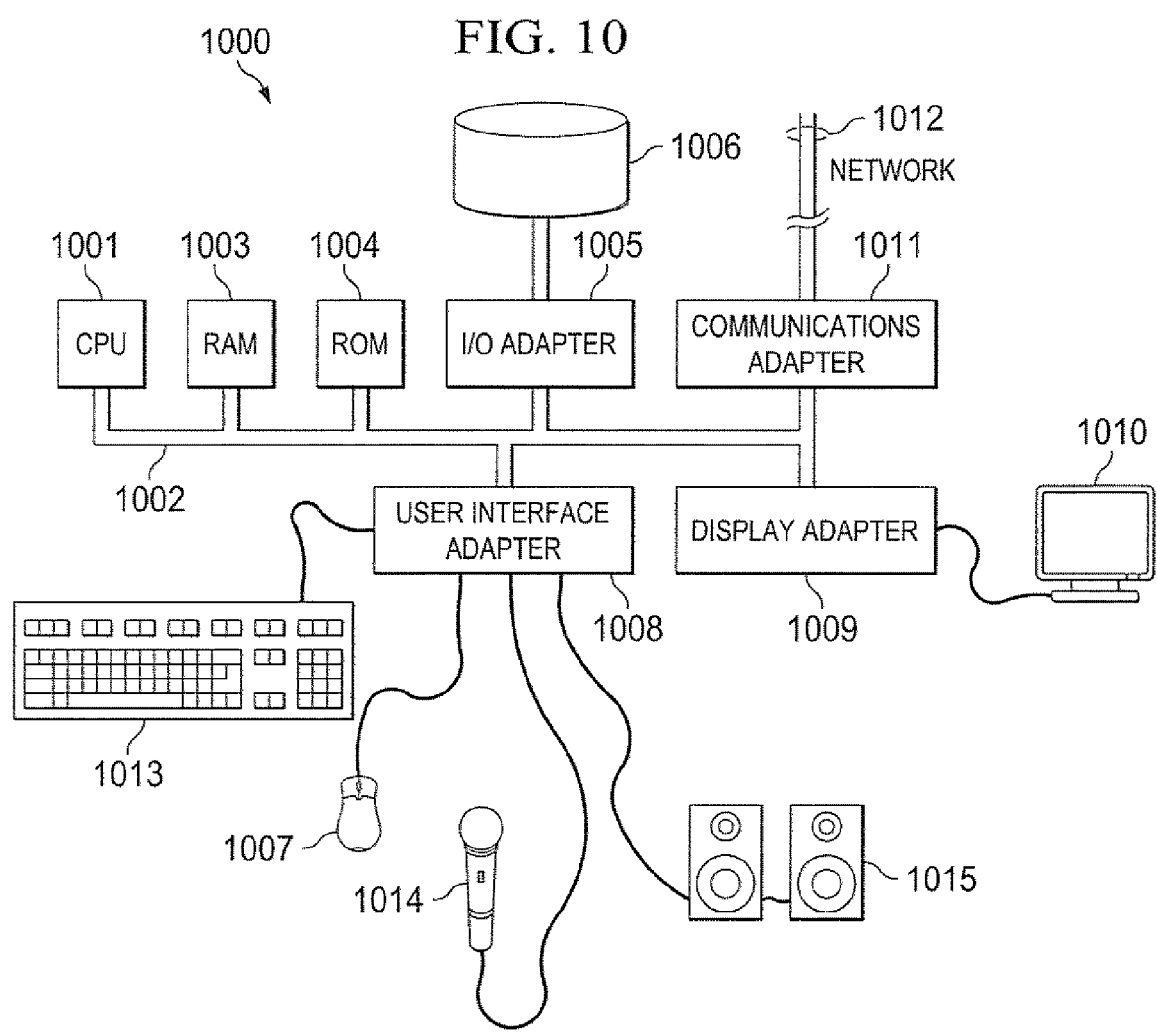
FIG. 10 shows an exemplary system on which an authoring tool and/or run-time player component may be implemented according to one embodiment of the present invention.

FIG. 10 illustrates an exemplary computer system 1000 on which authoring tool 21 and/or run-time player component 23 may be implemented according to one embodiment of the present invention. Central processing unit (CPU) 1001 is coupled to system bus 1002. CPU 1001 may be any general-purpose CPU. The present invention is not restricted by the architecture of CPU 1001 (or other components of exemplary system 1000) as long as CPU 1001 (and other components of system 1000) supports the inventive operations as described herein CPU 1001 may execute the various logical instructions according to embodiments of the present invention. For example, CPU 1001 may execute machine-level instructions according to the exemplary operational flow described above in conjunction with FIG. 7.

Computer system 1000 also preferably includes random access memory (EM) 1003, which may be SRAM, DAM, SDRAM, or the like. Computer system 1000 preferably includes read-only memory (ROM) 1004 which may be PROM, EPROM, EEPROM, or the like RAM 1003 and ROM 1004 hold user and system data and programs, as is well known in the art.

Computer system 1000 also preferably includes input/output (I/O) adapter 1005, communications adapter 1011, user interface adapter 1008, and display adapter 1009. I/O adapter 1005, user interface adapter 1008, and/or communications adapter 1011 may, in certain embodiments, enable a user to interact with computer system 1000 in order to input information, such as interacting with user interface 800 of authoring tool 21 to define presentation output objects (such as rectangle 801 of FIGS. 8A-8C), as described above.

I/O adapter 1005 preferably connects to storage device(s) 1006, such as one or more of hard drive, compact disc (CD) drive, floppy disk drive, tape drive, etc. to computer system 1000. The storage devices may be utilized when RAM 1003 is insufficient for the memory requirements associated with storing data for operations of the authoring tool 21 and/or run-time player component 23. Communications adapter 1011 is preferably adapted to couple computer system 1000 to network 1012, which may enable information to be input to and/or output from system 1000 via such network 1012 (e.g., the Internet or other wide-area network, a local-area network, a public or private switched telephony network, a wireless network, any combination of the foregoing). User interface adapter 1008 couples user input devices, such as keyboard 1013, pointing device 1007, and microphone 1014 and/or output devices, such as speaker(s) 1015 to computer system 1000. Display adapter 1009 is driven by CPU 1001 to control the display on display device 1010 to, for example, display information pertaining to an application being authored, such as displaying interface 800 including stage 202 with presentation objects rendered thereon by run-time player component 23, according to certain embodiments of the present invention.

It shall be appreciated that the present invention is not limited to the architecture of system 1000. For example, any suitable processor-based device may be utilized for implementing authoring tool 21 and/or run-time player component 23, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
receiving a first input in a software authoring environment, the first input related to authoring a multimedia application in the software authoring environment, the first input defining a presentation output object of the multimedia application;
in response to receiving the first input in the software authoring environment:
directly communicating, by the software authoring environment and through a pre-defined interface to a run-time player component, information related to a media object model for the multimedia application being edited in the software authoring environment, the media object model comprising a first hierarchy comprising data related to the presentation output object, the run-time player component separate from the software authoring environment;
updating, by the run-time player component, a shadow media object model in the run-time player component for the presentation output object based on the communicated information, the shadow media object model comprising a second hierarchy comprising at least a portion of the data in the media object model; and
in response to a determination by the run-time player component to update at least a portion of a stage in the software authoring environment, rendering, by the run-time player component to the stage in the software authoring environment, display of the presentation output object based on the updated shadow object model.

2. The method of claim 1, wherein the shadow object model comprises at least a portion of the first hierarchy of the media object model.

3. A method, comprising:
receiving a first input in a graphical user interface of an authoring tool, the first input comprising a selection of a run-time player component from a plurality of available run-time player components, each of the plurality of available run-time player components comprising a respective predefined interface for directly communicating between the authoring tool and that run-time player component, each of the plurality of available run-time player components separate from the authoring tool;
receiving a second input in the authoring tool, the second input corresponding to a presentation output object for a software application being authored in the authoring tool;
directly communicating, by the authoring tool and to the selected run-time player component through the predefined interface for the selected run-time player component, information related to a media object model in the authoring tool, the media object model corresponding to the software application being authored in the authoring tool, the media object model comprising a first hierarchy comprising data related to the presentation output object;

updating, by the selected run-time player component, a shadow media object model for the presentation output object based on the communicated information, the shadow media object model comprising a second hierarchy comprising at least a portion of the data in the media object model; and rendering, by the selected run-time player component to a stage in the authoring tool, display of the presentation output object based at least in part on the shadow media object model.

4. The method of claim 3, wherein the shadow media object model is maintained by the selected run-time player component such that as the authoring tool communicates media object model information to the selected run-time player component, the shadow media object model is updated by the selected run-time player component.

5. The method of claim 3, further comprising:
receiving a third input in the authoring tool, the third input comprising a modification to the presentation output object;
directly communicating, by the authoring tool, the modification to the selected run-time player component; and
updating, by the selected run-time player component, the shadow object model based at least in part on the communicated modification.

6. A method comprising:
receiving, by an authoring tool, an input corresponding to a presentation output object for a software application being developed in the authoring tool;
sending, by the authoring tool and to a run-time player component, information related to a media object model in the authoring tool, the media object model corresponding to the software application being developed in the authoring tool, the information configured for updating a shadow media object model in the run-time player component, the shadow media object model corresponding to the software application being developed in the authoring tool; and
receiving, by the authoring tool and from the run-time player component, a rendering of the presentation output object to a stage in the authoring tool, the rendering based on the shadow media object model in the run-time player component,
wherein the media object model comprises a first hierarchy comprising data related to the presentation output object for the software application and wherein the shadow media object model comprises a second hierarchy comprising at least a portion of the data in the media object model.

7. The method of claim 6, wherein the software application comprises a multimedia application.

8. The method of claim 6, wherein receiving the input corresponding to the presentation output object comprises at least one of:
receiving input for creating a new presentation output object for the software application being developed in the authoring tool; or
receiving input for editing an existing presentation output object for the software application being developed in the authoring tool.

9. The method of claim 6, wherein sending, by the authoring tool and to the run-time player component, the information comprises:

directly communicating the information to the run-time player component in a run-time file format.

10. The method of claim 9, wherein the run-time file format comprises Small Web Format (SWF).

11. The method of claim 6, wherein the authoring tool comprises computer-executable program code stored on a non-transitory computer-readable medium, the program code configured for:
receiving the input corresponding to the presentation output object for the software application;
sending, to the run-time player component, the information related to the media object model in the authoring tool; and
receiving, from the run-time player component, the rendering of the presentation output object to the stage in the authoring tool.

12. The method of claim 6, wherein sending, by the authoring tool and to the run-time player component, information related to the media object model in the authoring tool comprises:
sending the information between the authoring tool and the run-time player component through an application programming interface.

13. The method of claim 6 wherein receiving, by the authoring tool and from the run-time player component, the rendering of the presentation output object to the stage in the authoring tool is performed in response to a determination by the run-time player component to update at least a portion of the stage based on the information sent by the authoring tool to the run-time player component.

14. A method comprising:
presenting, by an authoring tool, a user interface comprising a stage for a software application being developed in the authoring tool;
receiving, by the authoring tool, an input corresponding to a presentation output object for the software application being developed in the authoring tool;
sending, by the authoring tool and to a run-time player component, information related to a media object model in the authoring tool, the media object model corresponding to the software application being developed in the authoring tool, the information configured for updating a shadow media object model in the run-time player component, the shadow media object model corresponding to the software application being developed in the authoring tool; and
receiving, by the authoring tool and from the run-time player component, a rendering of the presentation output object to the stage in the authoring tool, the rendering based on the shadow media object model in the run-time player component,
wherein the media object model comprises a first hierarchy comprising data related to the presentation output object for the software application and wherein the shadow media object model comprises a second hierarchy comprising at least a portion of the data in the media object model.

15. The method of claim 14, wherein the software application comprises a multimedia application.

16. The method of claim 14, wherein receiving the input corresponding to the presentation output object comprises at least one of:
receiving input for creating a new presentation output object for the software application being developed in the authoring tool; or receiving input for editing an existing presentation output object for the software application being developed in the authoring tool.

17. The method of claim 14, wherein sending, by the authoring tool and to the run-time player component, the information comprises:
   directly communicating the objects to the run-time player component in a run-time file format.

18. The method of claim 17, wherein the run-time file format comprises Small Web Format (SWF).

19. The method of claim 14, wherein the authoring tool comprises computer-executable program code stored on a non-transitory computer-readable medium, the program code configured for:
   presenting the user interface comprising the stage for the software application;
   receiving the input corresponding to the presentation output object;
   sending, to the run-time player component, the information related to the media object model in the authoring tool; and
   receiving, from the run-time player component, the rendering of the presentation output object to the stage in the authoring tool.

20. The method of claim 14, wherein sending, by the authoring tool and to the run-time player component, information related to the media object model in the authoring tool comprises:
   sending the information between the authoring tool and the run-time player component though a predefined interface.

21. A method, comprising:
   receiving, by a run-time player component and from an authoring tool, information related to a media object model in the authoring tool, the media object model comprising a presentation output object and corresponding to a software application being developed in the authoring tool, the information configured for updating a shadow media object model in the run-time player component, the shadow media object model corresponding to the software application being developed in the authoring tool;
   updating, by the run-time player component, the shadow media object model based at least in part on the information related to the media object model in the authoring tool; and
   sending, by the run-time player component and to the authoring tool, a rendering of the presentation output object to a stage in the authoring tool, the rendering based on the updated shadow media object model in the run-time player component,
   wherein the media object model comprises a first hierarchy comprising data related to the presentation output object for the software application and wherein the shadow media object model comprises a second hierarchy comprising at least a portion of the data in the media object model.

22. The method of claim 21, wherein the software application comprises a multimedia application.

23. The method of claim 21, wherein receiving, by the run-time player component and from the authoring tool, the information comprises:
   directly communicating the information to the run-time player component in a run-time file format.

24. The method of claim 23, wherein the run-time file format comprises Small Web Format (SWF).

* * * * *